United States Patent [19]

Sato et al.

[11] Patent Number: 5,648,413

[45] Date of Patent: Jul. 15, 1997

[54] STABILIZER FOR CHLORINE-CONTAINING POLYMERS, PROCESS FOR THE PREPARATION THEREOF AND CHLORINE-CONTAINING POLYMER COMPOSITION

[75] Inventors: Teiji Sato; Toshio Sato; Toshiaki Sugawara; Hiroshi Sawada; Seiji Wakaki; Satoru Ohta; Masaru Saito, all of Tokyo, Japan

[73] Assignee: Mizusawa Industrial Chemicals, Inc., Tokyo, Japan

[21] Appl. No.: 594,459

[22] Filed: Jan. 31, 1996

[30] Foreign Application Priority Data

Feb. 1, 1995 [JP] Japan ..................... 7-015366

[51] Int. Cl.$^6$ .............. C08K 13/02; C08K 9/06
[52] U.S. Cl. ........... 524/313; 252/315.2; 252/315.5; 252/400.3; 524/386; 524/399; 524/400; 524/450
[58] Field of Search ............ 252/315.2, 315.5, 252/400.3; 523/204; 524/313, 450, 386, 399, 400

[56] References Cited

U.S. PATENT DOCUMENTS 4,060,508  11/1977  Sugahara et al. ............ 252/400.3

FOREIGN PATENT DOCUMENTS

| 0027588 | 4/1981 | European Pat. Off. . |
| 0165647 | 12/1985 | European Pat. Off. . |
| 55-133441 | 10/1980 | Japan . |
| 62-87383 | 10/1994 | Japan . |

OTHER PUBLICATIONS

Database WPI, Derwent Publications, AN 80 85288C, Sekisui Chemi Ind KK.
Database WPI, Derwent Publications, AN 94 363720, Mizusawa Chem Ind Co.

*Primary Examiner*—Veronica P. Hoke
*Attorney, Agent, or Firm*—Robbins, Berliner & Carson, LLP

[57] ABSTRACT

A stabilizer for chlorine-containing polymers and a process for its preparation. The stabilizer comprises a fat or oil-saponified product composite silicate in the form of hydrophobic particles of a composition containing:

siliceous compound particles composed chiefly of amorphous or low-crystalline silicate of a metal of the Group II of periodic table, a metal of the Group IV and/or a metal of the Group V;

higher fatty acid salts of a metal of the Group II, a metal of the Group IV and/or a metal of the Group V held in the pores or on the surfaces of said siliceous compound; and a glycerin and/or glycerin derivatives.

16 Claims, 6 Drawing Sheets

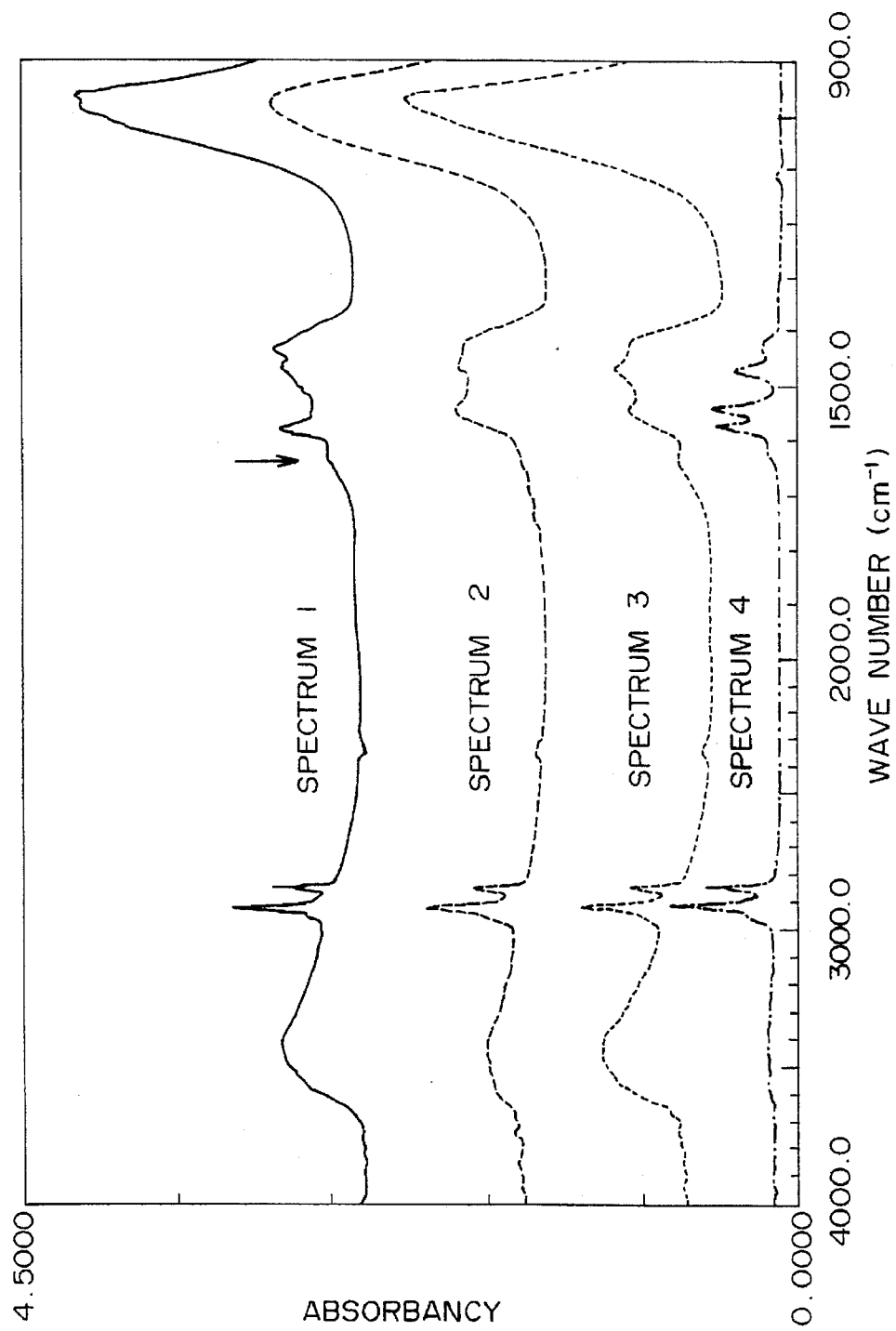

STABILIZER FOR CHLORINE-CONTAINING POLYMERS, PROCESS FOR THE PREPARATION THEREOF AND CHLORINE-CONTAINING POLYMER COMPOSITION

BACKGROUND OF THE INVENTION

1. Field of the Invention

The present invention relates to a stabilizer for chlorine-containing polymers and to a process for the preparation thereof. More specifically, the invention relates to a stabilizer for chlorine-containing polymers, which can be favorably blended into a chlorine-containing polymer, imparts excellent thermal stability and exhibits suppressed moisture re-absorption tendency, as well as to a process for the preparation thereof. The invention is further concerned with effectively utilizing, as a stabilizer, waste clay discharged in the step of refining fat or oil.

2. Prior Art

When exposed to the heat and light, chlorine-containing polymers such as vinyl chloride resins cause hydrochloric acid to be removed from the molecular chains thereof and undergo decomposition and discoloration. In order to stabilize vinyl chloride resins against the thermal decomposition, a variety of stabilizers and stabilizer compositions have heretofore been proposed and have been put into wide use.

Among such stabilizers, a variety of siliceous compounds have been used as inorganic stabilizers.

According to Japanese Patent Publication No. 32899/1977, a chlorine-containing polymer is blended with, as a heat stabilizer, a silicate such as synthetic calcium silicate which contains in the pores thereof an organic blending agent, and according to Japanese Laid-Open Patent Publication No. 15237/1992, a chlorine-containing polymer is blended with a fine crystalline calcium silicate hydrate.

Silicate particles such as calcium silicate particles exhibit good dyeing property, and can be excellently blended and dispersed into the resin, and further react with hydrogen chloride and with chlorine ions to trap them. However, these silicates are hydrophilic. This tendency becomes conspicuous when the silicates are in an amorphous form or in a fine crystalline form exhibiting excellent reactivity with hydrogen chloride.

That is, the siliceous compounds generally absorb water during the storage, and releases water when they are kneaded together with a chlorine-containing polymer causing the blended resin composition to be foamed.

Siliceous compound is rarely used by itself as a heat stabilizer and is generally used in combination with various organic blending agents. However, the siliceous compound is hydrophilic and is poorly compatible with hydrophobic organic components such as higher fatty acid salts.

In the step of refining fats or oils, furthermore, waste clay containing fats or oils in relatively large amounts is by-produced arousing a problem in regard to its disposal. If the waste clay can be effectively utilized, then it is greatly meaningful from the standpoint of preventing environmental pollution and effective utilization of resources.

SUMMARY OF THE INVENTION

The object of the present invention is to provide a stabilizer for chlorine-containing polymers, which can be favorably blended into a chlorine-containing polymer, exhibits excellent heat stability and suppressed tendency of moisture re-absorption, as well as a process for the preparation thereof.

Another object of the present invention is to provide a process which effectively utilizes clay containing fat or oil as a stabilizer for chlorine-containing polymers.

According to the present invention, there is provided a process for the preparation of a stabilizer for chlorine-containing polymers comprising a fat or oil-saponified product composite silicate obtained by mixing and reacting:

(1) a composition which contains;
  (a) a siliceous compound selected from the group consisting of silicic acid, silicate, aluminosilicate and acid-treated products thereof, and having reactive silicic acid; and
  (b) fat or oil; and (2) at least one selected from the group consisting of oxides, hydroxides and reactive salts of a metal of the Group II of periodic table, a metal of the Group IV and/or a metal of the Group V of amounts not smaller than the total amount of an equivalent of KOH required for saponifying the fat or oil and an amount for neutralizing the reactive silicic acid; in the presence of water;

converting the reactive silicic acid into a silicate of a metal of Group II of periodic table, a metal of the Group IV and/or a metal of the Group V; and carrying a saponified product of fat or oil on the siliceous compound.

According to the present invention, there is further provided a stabilizer for chlorine-containing polymers comprising hydrophobic particles of a composition containing a siliceous compound comprising a calcium silicate hydrate having substantially a single X-ray diffraction peak at 3.0 to 3.1 angstroms (this substance is hereinafter often referred to as CSH-1) and/or a crystalline lead silicate having chief X-diffraction peaks at 2,84 to 2,85, at 3.22 to 3.23, at 2.97 to 2.98, at 1.86 to 1.87 and at 4.2 to 4.1 angstroms (this substance is hereinafter often referred to as PbSH), and a calcium lead silicate hydrate having substantially a single X-ray diffraction peak at 3.05 to 3.15 angstroms (this substance is hereinafter often referred to as PbCSH); and a higher fatty acid calcium salt, a higher fatty acid lead salt, glycerin and/or glycerin derivatives held in the pores or on the surfaces of the siliceous compound.

There is further provided a stabilizer for chlorine-containing polymers, wherein the stabilizer is heated under atmospheric pressure or under reduced pressure at 50° to 300° C.

According to the preparation process of the present invention, saponified products of fats or oils that work to thermally stabilize chlorine-containing polymers such as PVCs, a siliceous compound, and at least one selected from the group consisting of oxides, hydroxides and reactive salts of a metal of the Group II of periodic table, a metal of the Group IV and/or a metal of the Group V, are reacted together competitively under grinding conditions of water system, to form a desired stabilizer.

Under the grinding conditions of basic water system, furthermore, fat or oil come into contact with water at increased frequencies, enabling fat or oil to be hydrolyzed at an increased rate compared with that of ordinary stirring system.

According to the present invention, furthermore, it is allowed to use waste clay (includes waste activated clay or waste clay) and crude fat or oil, to cheaply produce metal soaps having various molecular weights and various degrees of unsaturation directly from fat or oil, and to use them as chlorine-containing polymers, such as PVC, stabilizers.

Glycerin and low-molecular metal soaps which are saponified products of fat or oil are viscous liquids. When chemically or physically adsorbed by the siliceous compound particles composed chiefly of calcium silicate hydrate or the like having large specific areas, however, they assume the form of a stable solid powder and, at the same time, decrease hygroscopic property or moisture re-absorption property of calcium silicate hydrate or the like, that are causes of foaming chlorine-containing polymers such as PVCs.

The stabilizer of the present invention is non-toxic and can be excellently used for chlorine-containing polymers such as PVCs that are transparent or have self-lubricating property, non-foaming property or high heat resistance.

BRIEF DESCRIPTION OF THE DRAWINGS

FIG. 6 is a diagram of infrared-ray absorption spectra of the samples, the spectrum 1 being that of the air-dried powder of the slurry of a mixture of the sample B-1 obtained in the same manner as in Example 1 and calcium stearate (to which is added about 20% by weight or the air-dried slurry), the spectrum 2 being that of the powder of the same slurry just after it is heated and dried, the spectrum 3 being that of the same powder after it is preserved under the conditions of room temperature and a relative humidity of 75% for seven days, and the spectrum 4 being that of calcium stearate.

DETAILED DESCRIPTION OF THE INVENTION

Figure 1:
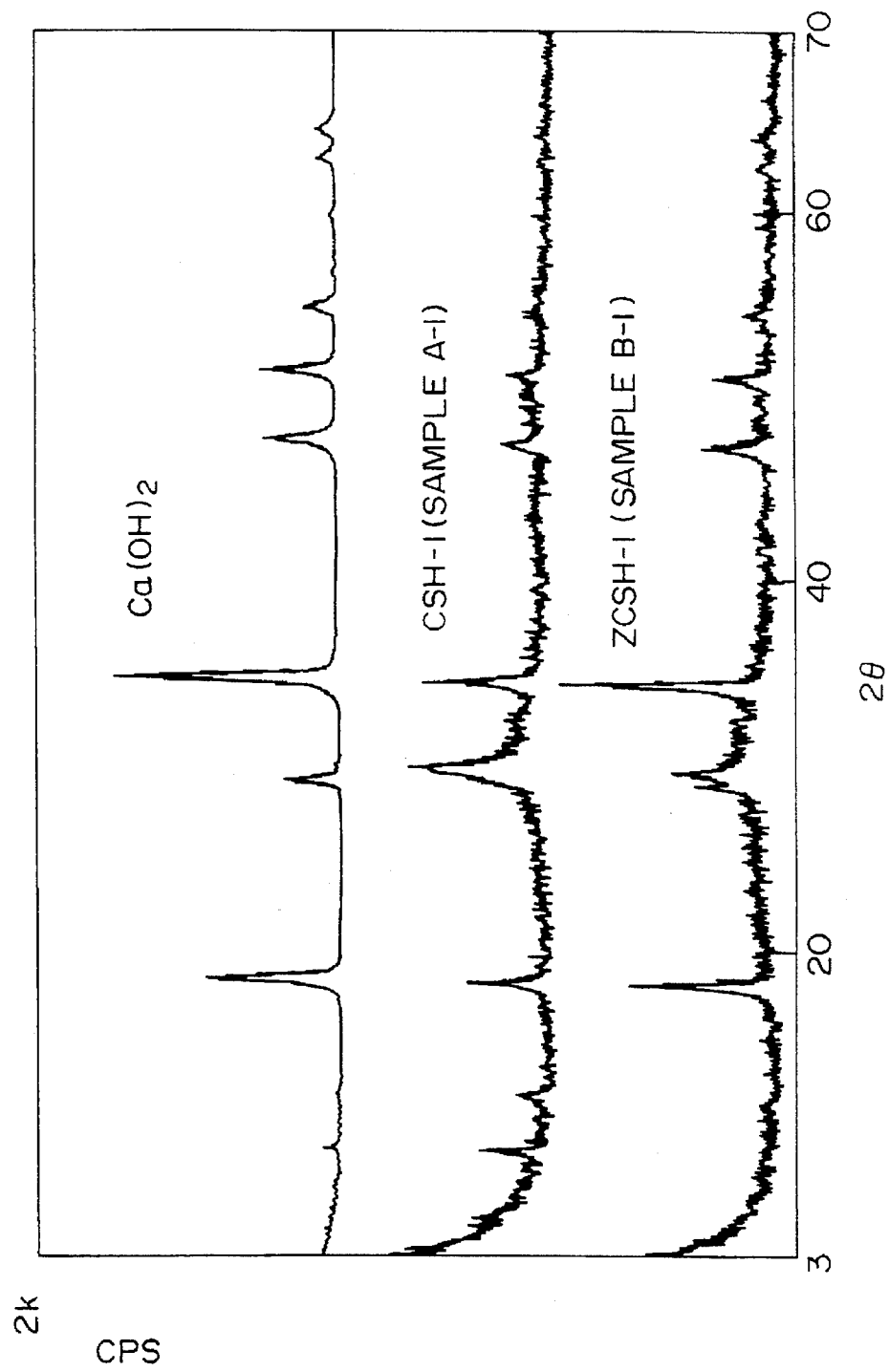
FIG. 1 is a diagram of X-ray diffraction spectra of a calcium silica composite hydroxide (CSH-1: sample A-1), a zinc calcium silica composite hydroxide (ZCSH-1: sample B-1), and a calcium hydroxide of a comparative example.

According to the present invention, (1) a composition which contains;

(a) a siliceous compound selected from the group consisting of silicic acid, silicate, aluminosilicate and acid-treated products thereof; and (b) fat and oil and, as required, a zinc compound; and (2) at least one (hereinafter referred to as Oxides or the like) selected from the group consisting of oxides, hydroxides and reactive salts of a metal of the Group II of periodic table, a metal of the Group IV and/or a metal of the Group V (hereinafter referred to as metals of the Group II, etc.); are wet-mixed in the presence of water.

Here, what is important is that the siliceous compound contains reactive silicic acid, and that at least one selected from the group consisting of oxides, hydroxides and reactive salts of a metal of the Group II, a metal of the Group IV and/or a metal of the Group V is used in an amount not smaller than the total amount of an equivalent number of KOH required for saponifying fat or oil and an equivalent amount for neutralizing the reactive silicic acid.

When the above-mentioned composition and the oxide or the hydroxide of a metal of the Group II, a metal of the Group IV and/or a metal of the Group V are wet-mixed together, the reactive silicic acid in the siliceous compound reacts with the oxide or the like of a metal of Group II, a metal of the Group IV and/or a metal of the Group V, forming an amorphous silicate of a metal of the Group II, a metal of the Group IV and/or a metal of the Group V having large porous volume in the siliceous compound. Moreover, fat or oil is saponified with the oxide or the like of a metal of the Group II, a metal of the Group IV and/or a metal of the Group V to form a higher fatty acid salt of a metal of the Group II, a higher fatty acid salt of a metal of the Group IV and/or a higher fatty acid salt of a metal of the Group V (hereinafter referred to as higher fatty acid salts of metals of the Group II, etc.), glycerin and/or glycerin derivatives.

The formed silicates of metals of the Group II or the like, higher fatty acid salts of metals of the Group II or the like, glycerin and glycerin derivatives all work as stabilizer components for the chlorine-containing polymers, and these components synergistically work to produce a high degree of heat stability as will be described later.

Moreover, the stabilizer obtained by the present invention is heat-treated under atmospheric pressure or reduced pressure at 50° to 300° C. and, preferably, at 100° to 200° C. to exhibit further improved moisture re-absorption-preventing property and heat stability.

When prior to carrying out the above-mentioned reaction, a zinc oxide or the like that will be described later is used among the oxides of metals of the Group II or the like, distinguished effects are obtained in preventing the chlorine-containing polymers from being colored in the initial stage and during the heating.

The effect of the zinc oxide or the like for preventing the coloration is exhibited particularly markedly when there is used an alkaline earth metal together with the zinc oxide. That is, the stabilizer of the type of an alkaline earth metal tends to impart warm color (red) to the chlorine-containing polymers. When a zinc oxide that tends to impart cold color (blue) is made present together therewith, development of a particular color is prevented due to the complementary color action of the two. Also, the stabilizer of the present invention has zinc component incorporated in the alkaline earth metal silicate (hereinafter, this substance is often referred to as ZCSH-1). Compared with the case where zinc component is separately added, therefore, the stabilizer of the present invention brings about an advantage in that the thermal hysteresis which develops so-called zinc burning is greatly lengthened.

According to the present invention, it is also important that fat or oil is saponified in the system in which the reactive silicic acid reacts with the oxide or the like of a metal of the Group II of periodic table, a metal of the Group IV and/or a metal of the Group V to form silicates of metals of the Group II, etc.

That is, a fresh silicate of a metal of the Group II, etc. that is just formed possesses macropores as well as high degree of activity and, hence, works to firmly hold higher fatty acid salts of metals of the Group II or the like, glycerin and glycerin derivatives formed by the saponification of fats or oils inside or on the surface of siliceous particles. For instance, in neutralizing a composition containing a siliceous compound that does not form amorphous silicate of a metal of the Group II, higher fatty acid salts of metals of the Group II or the like, glycerin and glycerin derivatives formed by the saponification of fat or oil are liberated from the siliceous compound causing the whole mixture to become jelly-like consistency which cannot be granulated. According to the present invention, however, the saponified product of fat or oil is effectively prevented from being liberated, and the reaction mixture can be easily granulated.

The wet-type mixing is advantageously carried out under grinding/mixing conditions. The grinding/mixing is a mixing condition in which fresh surfaces of a siliceous compound are exposed. Under this mixing condition, the above-mentioned reactions proceed mechano-chemically completely preventing the saponified products of fat or oil from being liberated and enabling the reaction mixture to be directly obtained in the form of a powder or to be obtained in the form of a powder through some drying.

In the stabilizer of the present invention, higher fatty acid salts of metals of the Group II, etc., glycerin and glycerin derivatives are uniformly held in the pores (macropores) or on the surfaces of the siliceous compound particles, featuring homogeneous and uniform composition for each of the particles. As will be described later, therefore, the composition is dispersed very little depending upon the particles.

Moreover, since the water-repellent higher fatty acid salts of metals of the Group II, etc. exist uniformly in the pores and on the surfaces of the particles, the stabilizer particles of the invention exhibit hydrophobic property, and can be easily blended into, i.e., compounded with, the chlorine-containing polymers and other organic stabilizers, producing advantage of lubricating action in that the stabilizer particles easily bite into the resin and are easily dispersed in the resin.

The base of the stabilizer is a silicate of a metal of the Group II or the like, and contains glycerin. Quite unexpectedly, however, the stabilizer exhibits very little tendency to absorb moisture. That is, the amorphous silicate usually has water of hydration and still reabsorbs moisture even after the water is removed by drying. However, the stabilizer of the present invention exhibits this tendency very little.

The above-mentioned actions and effects of the stabilizer of the present invention will be demonstrated by examples (thermal analysis of FIG. 2, infrared-ray spectra of FIGS. 4 to 6) that will be described later.

Figure 2:
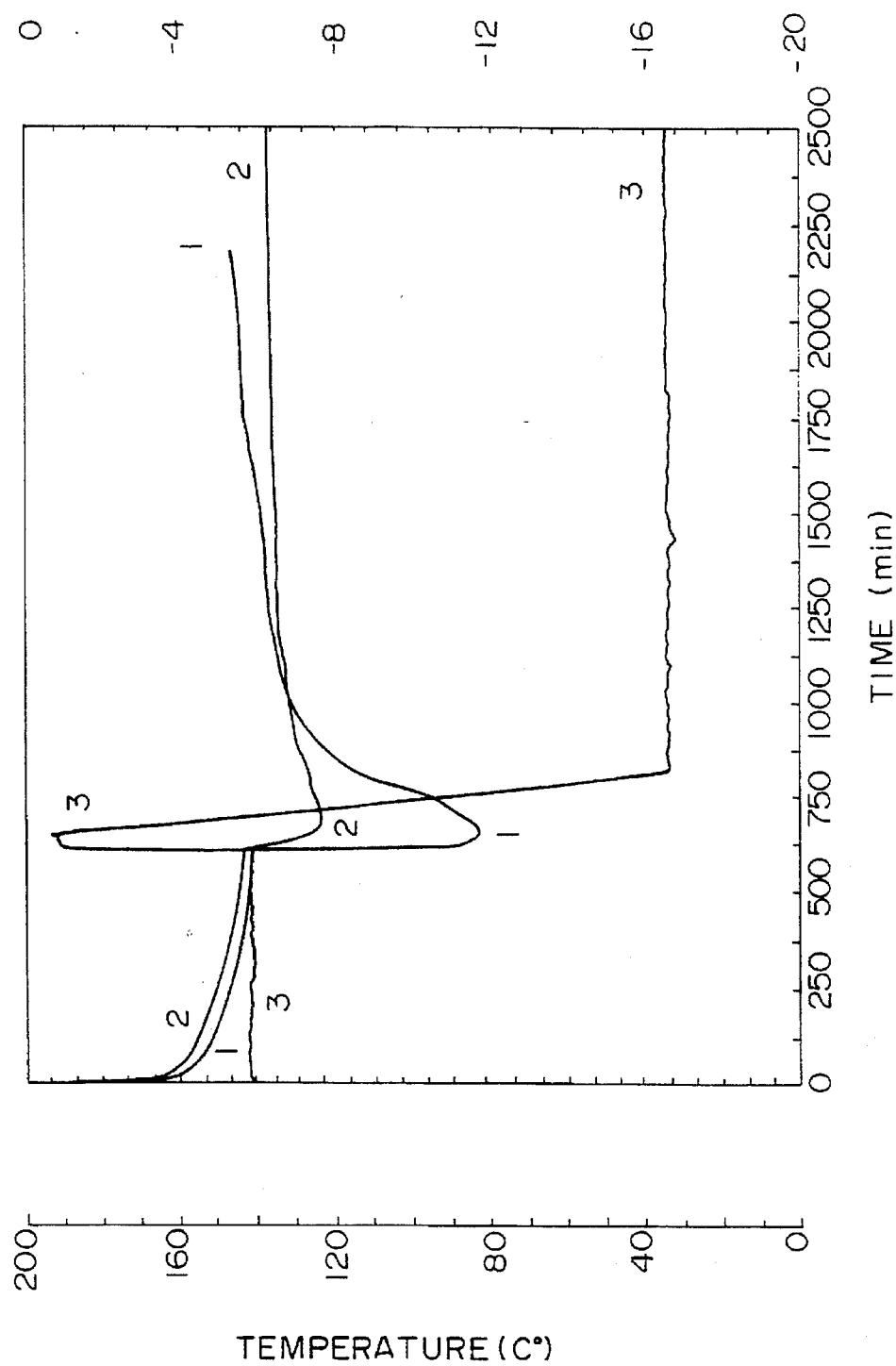
FIG. 2 is a diagram illustrating a heat-moisture re-absorption curve (curve 2) of a stabilizer comprising a fat and oil-saponified product composite silicate according to Example 1 of the present invention, a heat-moisture re-absorption curve (curve 1) of the powder of a sample B-1, and a change in the heating temperature (curve 3)

In FIG. 2 is plotted changes (TG(%)) in the weights of the samples that are heated and left for about 1000 minutes after heating. Referring to a TG curve (curve 1) of a zinc calcium silica composite hydroxide (sample B-1 that will be mentioned later in Examples) of before carrying fat or oil of FIG. 2, a peak of weight reduction due to the vaporization of water by heating (about 600 to 1000 minutes after the start of measurement) is very greater than a peak of weight reduction due to the vaporization of water by heating (about 600 to 1000 minutes after the start of measurement) of the stabilizer of Example 1 that carries fat or oil that is measured under the same conditions (refer to curve 3 for temperature conditions) and is represented by a TG curve (curve 2). The comparison of these two peaks tells that the stabilizer of the present invention carrying fat or oil is hydrophobic and does not almost hold water on the surfaces or inside thereof.

Referring to FIG. 2, furthermore, a comparison of change in the TG value (%) between the curves 1 and 2 after 1000 minutes indicates that the TG value of the curve 1 increases with the passage of time while the TG value of the curve 2 does not almost change. It will then be understood that the sample B-1 which does not carry fat or oil reabsorbs moisture to gradually increase its weight after water is removed in large amounts therefrom by heating, whereas the stabilizer of Example 1 that carries fat or oil does not almost reabsorbs moisture.

Figure 4:
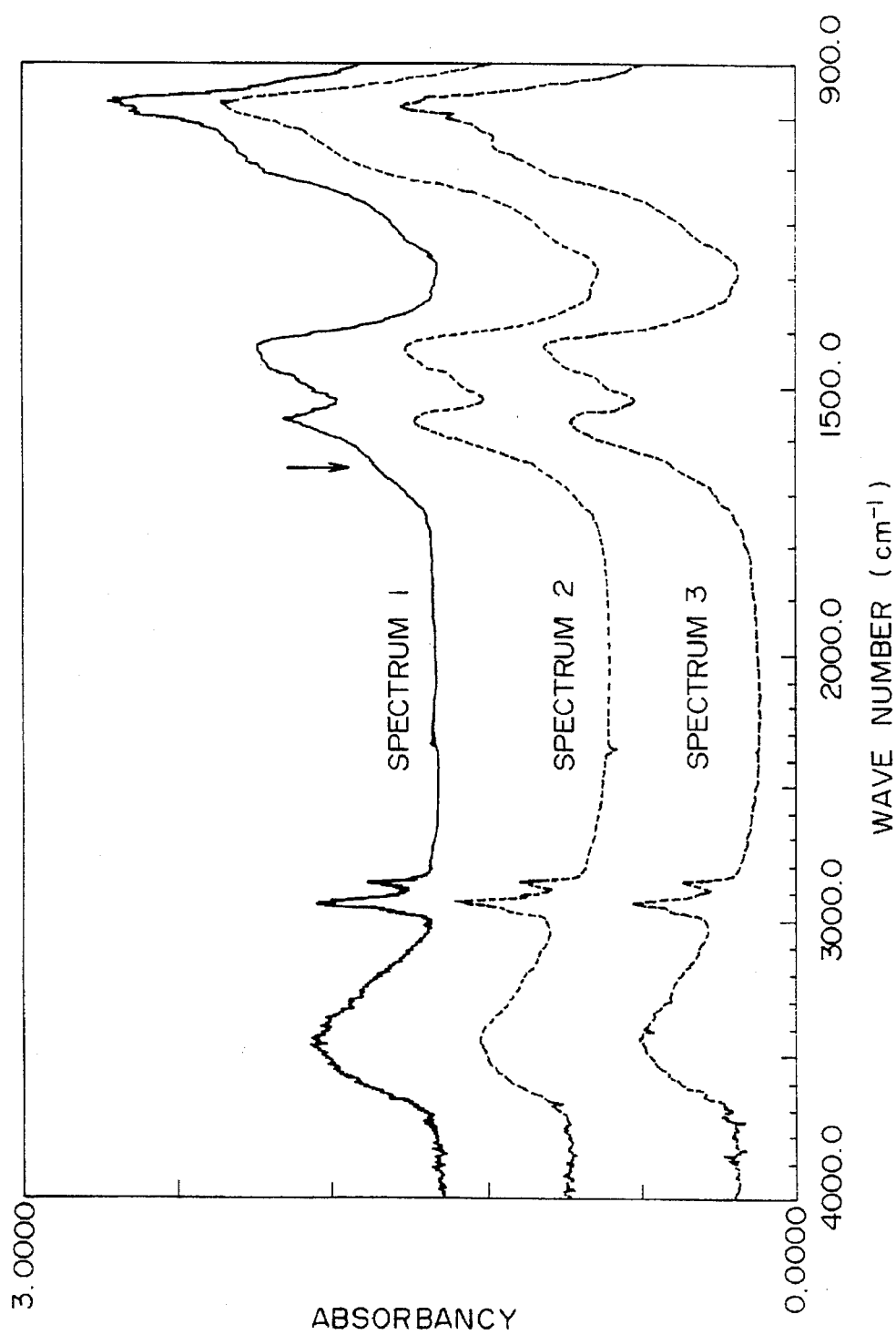
FIG. 4 is a diagram of infrared-ray absorption spectra of the samples, the spectrum 1 being that of the slurry of a product of Example 1 that is air-dried, the spectrum 2 being that of the product of Example 1 immediately after it is heated, and the spectrum 3 being that of the product of Example 1 after the dry and solid product of Example 1 is heated and is preserved under the conditions of room temperature and a relative humidity of 75% for seven days.

FIG. 4 is a diagram illustrating infrared-ray absorption spectra of samples obtained from the stabilizer of fat and oil-saponified product composite silicate prepared in Example 1 appearing later, that are treated under various conditions. In FIG. 4, the infrared-ray absorption spectrum (spectrum 1) of the air-dried slurry of the product of Example 1 exhibits absorption near 1647 $cm^{-1}$ due to O—H bond of water molecules as a shoulder of peak absorption at 1580 $cm^{-1}$. On the other hand, the infrared-ray absorption spectrum (spectrum 2) of the above air-dried product from which water is removed by heating indicates that the shoulder near 1647 $cm^{-1}$ has been missing. Even the infrared-ray absorption spectrum (spectrum 3) of the product of Example 1 that is heat-treated and is left at room temperature and at a relative humidity of 75% for seven days, indicates no absorption near 1647 $cm^{-1}$ due to O—H bond of water molecules, from which it can be confirmed that the stabilizer of the present invention difficultly reabsorbs moisture.

Figure 5:
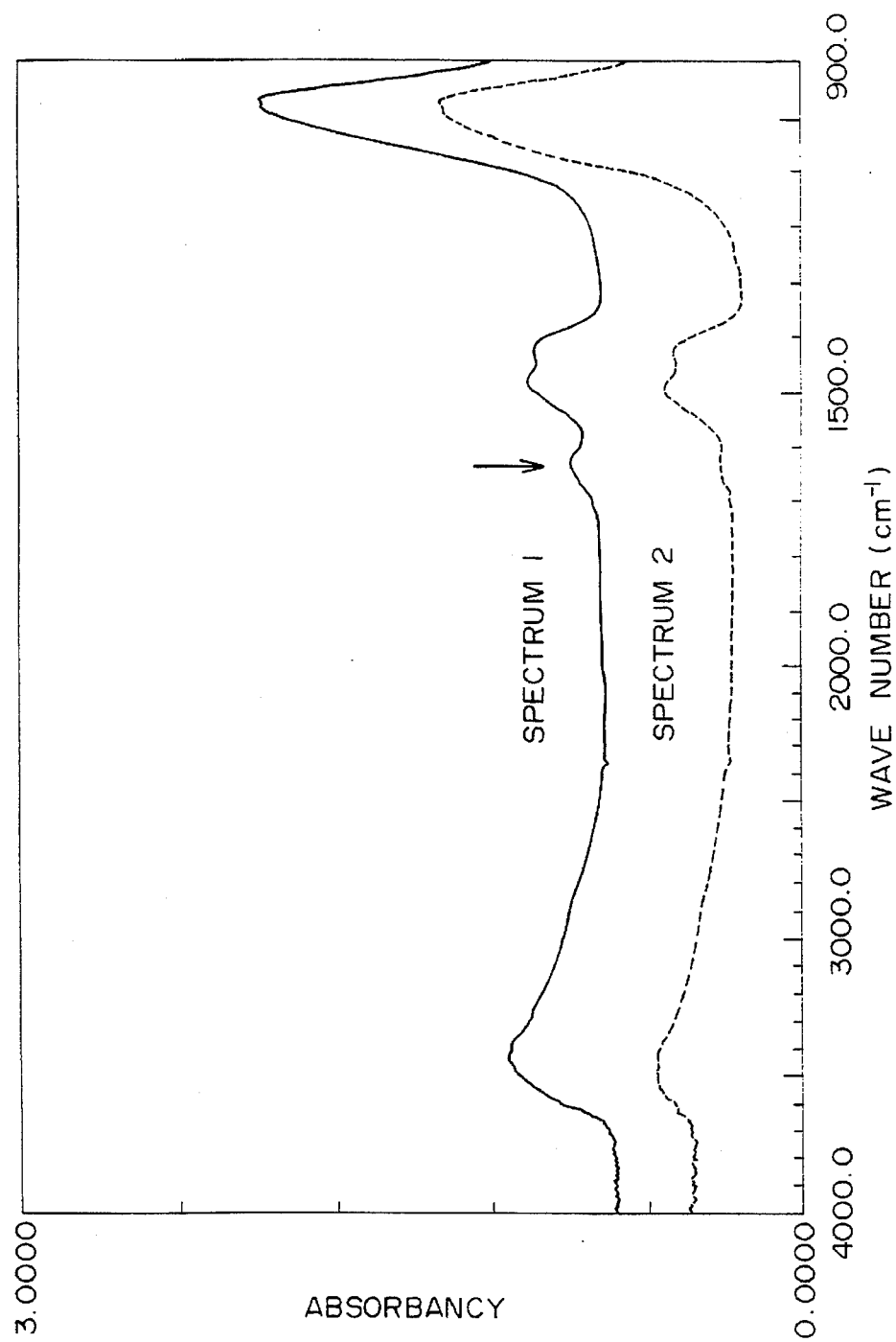
FIG. 5 is a diagram of infrared-ray absorption spectra of the samples, the spectrum 1 being that of the air-dried slurry of a composite silicate obtained in the same manner as in Example 1 but without using fat or oil, and the spectrum 2 being that of the above air-dried slurry just after it is heated and cooled.

FIG. 5 is a diagram of infrared-ray absorption spectra of an air-dried zinc calcium silica composite hydroxide that is obtained in the same manner as in Example 1 but without using fat and oil, that has not been heat-treated (spectrum 1) and of the same air-dried zinc-calcium-silica composite hydroxide that has been heat-treated (spectrum 2). It will be confirmed that the zinc calcium silica composite hydroxide that does not carry fat and oil has poor water repellency and, hence, still exhibits absorption near 1647 $cm^{-1}$ due to O—H bond of water molecules even after it is heat-treated. Though not shown in FIG. 5, the infrared-ray absorption spectrum of the heat-treated sample that is left to stand at room temperature at a relative humidity of 75% for one week resembles the spectrum 1, indicating that the zinc calcium silica composite hydroxide without carrying fat and oil tend to easily reabsorbs moisture.

FIG. 6 is a diagram showing infrared-ray absorption spectra of an air-dried powder of a homogeneous slurry of a mixture of the zinc calcium silica composite hydroxide (sample B-1) obtained in the same manner as in Example 1 and a calcium stearate (to which is added about 20% by weight of the air-dried slurry) (spectrum 1), of a powder of the same slurry just after it is dried by heating (spectrum 2), of the same powder after it is left to stand at room temperature at a relative humidity of 75% (spectrum 3), and of the calcium stearate (spectrum 4). As will be obvious from the spectrum 3, a simple mixture of the composite silicate and an organic acid calcium salt is not capable of preventing the mixture from condensing water, and fails to accomplish the actions and effects of the stabilizer of the present invention.

When fat or oil is carried on the surfaces of the composite silicate like the stabilizer of the present invention as described above, it is allowed to obtain a hydrophobic stabilizer of a composite silicate which difficultly reabsorbs moisture. It will be easily understood that the property of not reabsorbing moisture of the stabilizer is not obtained by simply adding a widely known higher fatty acid salt to the composite silicate.

In the stabilizer of the present invention, the organic components, i.e., higher fatty acid salts are firmly held by siliceous particles, and plate out very little.

Furthermore, the stabilizer of the present invention has relatively improved whiteness and gives an advantage that it is not thermally deteriorated and is not colored even after it is treated at high temperatures. This quite holds true even when fat or oil that are used are waste fat or oil.

That is, in the present invention, it is considered that the reactive silicic acid in the siliceous compound is converted into a silicate of an alkaline earth metal to exhibit improved whiteness.

Glycerin has a defect in that it is colored and is deteriorated when heated at high temperatures. In the stabilizer of the present invention, however, it is considered that glycerin is stabilized being coordinated on the silicate of a metal of the Group II.

According to the most important aspect of the process of the present invention, the alkaline earth metal silicate exists as a calcium silicate hydrate (CSH-1) having substantially a single X-ray diffraction peak at 3.0 to 3.1 angstroms. Besides, the lead silicate and the calcium lead silicate exist in the form of crystalline lead silicate (PbSH) having chief X-ray diffraction peaks at 2.84 to 2.85, at 3.22 to 3.23, at 2.97 to 2.98, at 1.86 to 1.87 and at 4.2 to 4.1 angstroms, and calcium lead silicate hydrate (PbCSH) having a substantially single X-ray diffraction peak at 3.05 to 3.15 angstroms. They are excellent with respect to all of the above-mentioned points.

Preferred Examples

[Siliceous Compound]

The siliceous compound that is used as a starting material of the present invention may be silicic acid, silicate, layer silicic acid, aluminosilicate or product treated with acid thereof, provided it contains reactive silicic acid.

The reactive silicic acid stands for silicic acid that is extracted as sodium silicate when it is reacted with an NaOH aqueous solution. Its examples include silica that dissolves in the Hashimoto and Jackson's method (boiling reaction in an aqueous solution of 0.5N NaoH solution for 2.5 minutes), silica that dissolves under basic grinding conditions, such as cristobalite, opal CT, montmorillonite, chlorite, etc, in addition to, for example, amorphous silica. It is desired that the reactive silicic acid is contained in an amount of not smaller than 10% by weight and, particularly, not smaller than 30% by weight per the siliceous compound.

It is desired that the siliceous compound used in the present invention has a specific surface area of not smaller than 10 m$^2$/g.

Examples of the amorphous silica includes white carbon, wet-type amorphous silica, and silica obtained by treating with acid clay minerals of the group of smectites such as acidic clay (includes acidic), montmorillonite, Fuller's earth, etc. It is desired that the amorphous silica usually has a BET specific surface area of from 150 to 400 m$^2$/g, and its secondary particle diameter ranges from 1 to 10 µm and, particularly, from 1 to 5 µm.

Examples of the layer silicic acid include magadiite, kenyte, makatite, ailalite and kanemite, that are treated with acid.

Examples of the silicate include silicates of alkaline earth metals such as magnesium silicate, calcium silicate, barium silicate and strontium silicate; silicates of metals of the Group IIb such as zinc silicate or the like; silicates of metals of the Group IV such as lead silicate or the like; and silicates of metals of the Group V such as antimony silicate, which contain the above-mentioned reactive silicic acid and may be used alone or in a combination of two or more kinds. These silicates may be synthesized by a widely-known wet-type method or dry-type method.

Examples of the aluminosilicate include layer aluminosilicates and, particularly, a variety of clay minerals, tectosilicates and those zeolites that contain the above-mentioned reactive silicic acid.

Most of the naturally occurring clay minerals such as acidic clay, montmorillonite, bentonite, sepiolite and halloysite contain reactive silica such as amorphous silicic acid and crystobalite, and can be used for accomplishing the objects of the present invention. When the clay minerals are treated with acid, furthermore, alumina and other metal components in the clay elute out contributing to increasing the content of the reactive silicic acid (active silicic acid) and to advantageously accomplishing the objects of the present invention. It is desired that the specific surface area of the clay and the clay treated with acid (active clay) is from 10 to 350 m$^2$/g.

The acid that is used may be either an inorganic acid or an organic acid without any particular limitation. From the economical standpoint, however, use is made of such an acid as hydrochloric acid, sulfuric acid, nitric acid or phosphoric acid. These acids are used for the acid-treatment reaction in the form of a diluted aqueous solution.

The naturally occurring zeolites such as mordenite, clinoptilolite and faujasite, in many cases, contain reactive silicic acid, and can be advantageously used to accomplish the objects of the present invention. Furthermore, the crystalline zeolites such as zeolite A, zeolite X, zeolite Y, zeolite P, analcime and sodalite can be easily turned into amorphous form upon treatment with acid and can, hence, be used to accomplish the objects of the present invention.

[Oil- or Fat-containing Composition]

Fat or oil which are starting materials widely exist in the natural world of animals and plants, and chiefly comprise fatty acid and ester of glycerin. Use can be made of fat or oil of plants such as soybean oil, rape oil, palm oil, palm kernel oil, cotton seed oil, coconut oil, rice bran oil, sesame oil, castor oil, linseed oil, olive oil, tung oil, tsubaki oil, peanut oil, kapok oil, cacao oil, Japan wax, sunflower oil and corn oil; fish oils such as sardine oil, herring oil, squid oil and saury oil; and fat or oil of animals such as lever oil, whale oil, beef tallow, butter tallow, horse oil, pig tallow and mutton tallow, in a single kind or in a combination of two or more kinds.

Examples of the used fat or oil further include waste edible oils used as frying oils in household and businesses, edible oils used by food manufacturers, oils recovered by edible fat-and-oil refineries, and silicone oil.

According to the present invention, it is further allowable to use siliceous compounds adsorbing fat or oil, such as waste clay (includes waste clay or waste activated clay) containing fat or oil discharged in the step of, for example, refining fat or oil, in addition to using the above-mentioned siliceous compound and the fat or oil which are mixed together. That is, active clay (clay treated with acid) has been extensively for adsorbing (decoloring) pigments contained in the fat or oil. The waste clay discharged in the step of refining contains fat or oil in amounts of from 5 to 60% by weight per the whole amount. The present invention effectively utilizes both clay and fat or oil contained therein as stabilizer components.

It is desired that the composition used in the present invention contains the siliceous compound in an amount of from 2 to 99% by weight and, particularly, from 30 to 70% by weight and fat or oil in amounts of from 1 to 98% by weight and, particularly, from 30 to 70% by weight on the basis of the two components. When the content of the siliceous compound is smaller than the above-mentioned range, it becomes difficult to handle the siliceous compound in the form of powder. When the content of the siliceous compound is larger than the above-mentioned range, on the other hand, the stabilizing performance is lost.

[Mixing Reaction]

According to the present invention, the above-mentioned composition and at least one selected from the group consisting of oxides, hydroxides and reactive salts of a metal of the Group II of periodic table, a metal of the Group IV and/or a metal of the Group V, are mixed and reacted together in the presence of water. During the reaction, the siliceous compound, fat or oil and oxides of metals of the Group II, etc. should be made present in the reaction system. Here, there is no particular limitation in the order of adding these components.

In order to establish desired reaction conditions by adjusting the mixing ratio of the reaction product, i.e., by adjusting the mixing ratio of the siliceous compound, fat or oil, and oxides or the like of metals of the Group II, etc., and in order that the fat or oil-saponified product composite silicate finally obtained through the mixing reaction will have a composition that lies within a desired range, these reaction products may be suitably added after the reaction products have been subjected to the mixing reaction. In this case, the reaction products may be added irrespective of the above-mentioned features of the present invention and in amounts that may produce desired actions and effects of the present invention without any particular limitation.

As the oxides or the like of metals of the Group II, there are chiefly used oxides or the like of alkaline earth metals and/or zinc. As the oxides or the like of alkaline earth metals, there can be favorably used calcium hydroxide and, particularly, milk of lime, as well as calcium oxide, magnesium oxide and magnesium hydroxide. Examples of the zinc oxide or the like include zinc acetate, zinc (II) acetyl acetonate, zinc benzoate, zinc bromate, zinc p-tert-butyl benzoate, basic zinc carbonate, zinc 4-cyclohexyl butyrate, zinc dibenzyldithiocarbamate, zinc di-n-butyldithiocarbamate, zinc 2-ethyl hexanoate, zinc iodide, zinc lactate, zinc nitrate, zinc oxide, zinc phenolsulfonate, zinc phosphate, zinc pyrithione, zinc salicylate, zinc stearate, zinc sulfate, zinc thiocyanate, zinc metaantimonate, zinc antimony oxide, zinc borate, zinc aluminum oxide, gahnite, zinc aluminum phosphate halide hydrate, zinc aluminum phosphate hydroxide hydrate, zinc aluminum silicate, dinalcite, zinc aluminum sulfate hydrate, zinc calcium hydroxide silicate, zinc carbonate, zinc carbonate hydroxide, zinc calcium hydroxide silicate, zinc carbonate hydroxide hydrate, zinc chlorate hydrate, zinc hydrogenphosphate hydrate, zinc hydrogenphosphite hydrate, zinc hydroxide, zinc hydroxide hydrate, Vismirnovite, zinc iodate, lithium zinc iodate, zinc magnesium aluminum silicate hydrate, zinc magnesium phosphate, zinc oxalate, zinc oxide borate hydrate, zinc oxide phosphate, zinc phosphate, zinc phosphite, zinc silicate, zinc sulfate, zinc sulfate hydroxide, zinc sulfide, zinc titanium oxide, zinc titanium sulfate and zinc titanium sulfide.

As the oxides or the like of the Groups IV and V, there can be used preferably lead hydroxide ($Pb(OH)_2$), lead oxide (PbO), tin oxide ($SnO_2$, SnO), antimony oxide ($Sb_2O_3$, $Sb_2O_4$, $Sb_2O_5$) and, more preferably, lead hydroxide and lead oxide.

The oxides, hydroxides and reactive salts of metals of the Groups II, IV and V can be used in a combination of at least one or more kinds.

The oxides, hydroxides and/or reactive salts of metals of the Groups II, IV and/or V should be used in amounts larger than a total amount of the equivalent of KOH required for saponifying fat or oil and the amount required for neutralizing the reactive silicic acid.

Actions and effects of the present invention are exhibited more effectively when the oxides or the like of metals of the Group II, etc. are used in amounts of 1.01 to 2000 times by weight as much as the equivalent of KOH that is required for saponifying fat or oil.

When zinc oxides or the like are used in an attempt to obtain distinguished effect for preventing coloring, it is recommended that zinc oxides are used in amounts of from 0.1 to 60% by weight and, particularly, from 5 to 30% by weight with respect to the amount of the siliceous compound.

The wet-type grinding reaction stands for the one that is carried out under the conditions where the mechanical grinding force is imparted to the amorphous silica or the like, and is generally carried out at a relatively low temperature which is usually not higher than 70° C. and is, particularly, from 15° to 50° C. for 3 to 300 hours by using a reaction device such as ball mill, tube mill, vibration mill or beads mill.

According to a preparation process of the present invention, CSH-1 or ZCSH-1 and/or PbSH, PbCSH are reacted and formed under the wet-type grinding condition in a tube mill to which are fed water and grinding medium by using starting materials of calcium salt and/or lead salt in excess mol amounts with respect to silica. Then, fat or oil are added thereto to carry out hydrolysis reaction under the grinding condition thereby to form a metal soap, glycerin and glycerin derivatives. Thereafter, the slurry of the above product which is in a wet-type ground and mixed state is heated to vaporize water, thereby to form a solid composite which is then pulverized or classified to obtain a product of the present invention.

The thus obtained product (stabilizer) is a fat or oil-saponified product composite silicate comprising a hydrophobic particle of a composition comprising; an amorphous or low-crystalline silicate chiefly of a metal of the Group II, a metal of the Group IV and/or a metal of the Group V; a higher fatty acid salt of a metal of the Group II, a higher fatty acid salt of a metal of the Group IV and/or a higher fatty acid salt of a metal of the Group V that are held in the pores or on the surfaces of the siliceous compound; and glycerin and/or glycerin derivatives.

The fat or oil-saponified product composite silicate usually contains the siliceous compound in an amount of from 1 to 99% by weight, a higher fatty acid salt of a metal of the Group II, a higher fatty acid salt of a metal of the Group IV and/or a higher fatty acid salt of a metal of the Group V in amounts of from 0.4 to 97% by weight, and glycerin and/or glycerin derivatives as glycerin component in amounts of from 0.02 to 60% by weight, on the basis of the three components.

The stabilizer of the present invention is used in an amount of from 0.1 to 50 parts by weight and, preferably, from 0.1 to 10 parts by weight and, most preferably, from 0.5 to 2.0 parts by weight for the chlorine-containing polymer (100 parts), making it possible to prevent foaming and to obtain long-tasting heat resistance.

Concretely speaking, the present invention provides a chlorine-containing polymer composition comprising, per 100 parts by weight of a chlorine-containing polymer, (A) from 0.1 to 50 parts by weight of a fat or oil-saponified product composite silicate of the invention, (B) from 0.1 to 50 parts by weight of at least the one selected from the group consisting of oxides, hydroxides and reactive salts of zinc, (C) 0.1 to 25 parts by weight of alcohols and/or partial esters thereof, and (D) 0.05 to 5 parts by weight of a β-diketone to a β-keto-ester compound and/or a phosphorus ester compound.

Examples of the chlorine-containing polymer include polyvinyl chloride, polyvinylidene chloride, chlorinated polyethylene, chlorinated polypropylene, chlorinated rubber, vinyl chloride-vinyl acetate copolymer, vinyl chloride-ethylene copolymer, vinyl chloride-propylene copolymer, vinyl chloride-styrene polymer, vinyl chloride-isobutylene copolymer, vinyl chloride-vinylidene chloride copolymer, vinyl chloride-styrene-maleic anhydride terpolymer, vinyl chloride-styrene-acrylonitrile copolymer, vinyl chloride-butadiene copolymer, vinyl chloride-propylene chloride copolymer, vinyl chloride-vinylidene chloride-vinyl acetate terpolymer, vinyl chloride-styrene-maleic anhydride terpolymer, vinyl chloride-acrylic ester copolymer, vinyl chloride-maleic ester copolymer, vinyl chloride-methacrylic ester copolymer, vinyl chloride-acrylonitrile copolymer, polymer such as internally plasticized polyvinyl chloride, or blends of chlorine-containing polymers thereof and polyethylene, polybutene, ethylene-vinyl acetate copolymer, ethylene-propylene copolymer, polystyrene, acrylic resin, acrylonitrile-butadiene-styrene copolymer, acrylic ester-butadiene-styrene copolymer or the like.

The resin composition blended with the stabilizer of the present invention may be further blended with a variety of additives that have been widely known, such as stabilizers or stabilizer assistants like non-metallic stabilizer, organotin stabilizer, basic inorganic salt, etc., as well as plasticizer, initial coloration improving agent, alcohols and/or partial esters thereof, antioxidizing agent, photo-stabilizer, nucleating agent, filler, epoxy stabilizer, organic chelator, pigment, antistatic agent, anti-fogging agent, plate-out preventing agent, flame retardant, and lubricating agent in amounts that will not impair the stability.

It is further allowable to blend inorganic stabilizer such as compound containing perhalogen oxyacid, hydrotalcite compounds, lithium aluminum composite hydroxide, etc. Concretely speaking, there may be blended zinc hydrotalcite compounds, perchloric acid hydrotalcite compounds, and lithium aluminum composite oxides of perchloric acid.

More concretely, examples of the compound containing perhalogen oxyacid include:

(1) Hydrotalcite compound treated with perchloric acid disclosed in Japanese Patent Application No. 235158/1984;

(2) Lithium aluminum carbonate hydrate treated with perchloric acid;

(3) Gel structures of amorphous silica, alumina and alumina-silica including perhalogen oxyacid anions (perchloric acid anions, periodic acid anions, etc.), or inorganic minerals having anion-exchanging property or anion-adsorbing property (Japanese Patent Applications Nos. 216243/1985 and 235156/1984);

(4) Metal salts of perchloric acid (constituent metals may be lithium, sodium, potassium, strontium, barium, zinc, cadmium, lead, aluminum, etc.); and (5) Silicates treated with perchloric acid such as those treated with perchloric acid, e.g., calcium silicate, magnesium silicate, barium silicate, zinc silicate and lead silicate; and various siliceous clay minerals treated with perchloric acid, e.g., kaolin, bentonite, mica powder, talk, diatomaceous earth, acidic clay, active clay and zeolite.

Examples of the organotin compound include organotin mercaptides, organotin sulfides, organotin mercaptide-sulfides, organotin mercaptocarboxylates and organotin carboxylates.

(1) Examples of the organotin mercaptides include diorganotin mercaptides such as dibutyltin bis (laurylmercaptide), dimethyltin bis(stearylmercaptide), dioctyltin bis(mercaptoethyl-tall oil fatty acid ester), dioctyltin bis(2-mercaptoethyl caprylate), dibutyltin bis (mercaptoethyl-tall oil fatty acid ester), dimethyltin bis (mercaptoethyl stearate), dioctyltin bis (isooctylthioglycolate), dioctyltin bis(2-ethylhexylthioglycolate), dioctyltin bis (dodecylthioglycolate), dioctyltin bis (tetradecylthioglycolate), dioctyltin bis (hexadecylthioglycolate), dioctyltin bis (octadecylthioglycolate), dioctyltin bis($C_{12-16}$ mixed alkylthioglycolate), dibutyltin bis (isooctylthioglycolate), dimethyltin bis (isooctylmercaptopropionate), bis(2-mercaptocarbonylethyl)tin bis(isooctylthioglycolate), and bis(2-butoxycarbonylethyl)tin bis (butylthioglycolate), as well as monoorganotin mercaptides such as monobutyltin tris (laurylmercaptide), monobutylmonochlorotin bis (laurylmercaptide), monooctyltin tris(2-mercaptoethyl caprylate), monobutyltin tris(mercaptoethyl-tall oil fatty acid ester), monomethyltin tris(mercaptoethyl-tall oil fatty acid ester), monomethyltin tris (mercaptoethyl laurate), monomethyltin tris (mercaptoethyl stearate), monomethyltin tris (mercaptoethyl oleate), monooctyltin tris (isooctylthioglycolate), monooctyltin tris(2-ethylhexyl thioglycolate), monooctyltin tris (dodecylthioglycolate), monooctyltin tris (tetradecylthioglycolate), monooctyltin tris (hexadecylthioglycolate), monooctyltin tris($C_{12-16}$ mixed alkylthioglycolate), monooctyltin tris (octadecylthioglycolate), monobutyltin tris (isooctylthioglycolate), monobutyltin tris (isooctylmercaptopropionate), monomethyltin tris (isooctylthioglycolate), monomethyltin tris (tetradecylthioglycolate), 2-methoxycarbonylethyltin tris (isooctylthioglycolate), and 2-butoxycarbonylethylt in tris (2-ethylhexylthioglycolate).

(2) Examples of the organotin sulfides include methylthiostannoic acid, butylthiostannoic acid, octylthiostannoic acid, dimethyltin sulfide, dibutyltin sulfide, dioctyltin sulfide, dicyclohexyltin sulfide, monobutyltin sulfide oxide, 2-methoxycarbonylethyltin sulfide, 2-ethoxycarbonyltin sulfide, 2-butoxycarbonyle thyltin sulfide, 2-isopropoxycarbonylethyltin sulfide, bis(2-methoxycarbonylethyl)tin sulfide and bis(2-propoxycarbonylethyl)tin sulfide.

(3) Examples of the organotin mercaptide sulfides include bis[monobutyl-di (isooctoxycarbonylmethylenethio)tin] sulfide, bis [dibutylmono(isooctoxycarbonylmethylenethio) tin] sulfide, bis[bis(2-methoxycarbonylethyl)tin isooctylthioglycolate] sulfide, bis(methyltin diisooctylthioglycolate) disulfide, bis(methyl/dimethyltin mono/diisooctylthioglycolate) disulfide, bis(methyltin diisooctylthioglycolate) trisulfide, bis(butyltin diisooctylthioglycolate) trisulfide, bis[methyltin di(2-methylcaptoethyl caprylate) sulfide, and bis[methyltin di(2-mercaptoethyl caprylate)] disulfide.

(4) Examples of the organotin mercaptocarboxylates include dibutyltin-β-mercaptopropionate, dioctyltin-β-mercaptopropionate, dibutyltin mercaptoacetate, bis(2-methoxycarbonylethyl)tin thioglycolate, and bis(2-methoxycarbonylethyl)tin mercatopropionate.

(5) Examples of the organotin carboxylates include aliphatic monovalent carboxylates such as mono or dimethyltin, mono or dibutyltin, mono or dioctyltin, and octoate, laurate, myrystate, palmitate, stearate or isostearate of mono or bis(butoxycarbonylethyl)tin; maleates such as maleate polymer, butyl maleate, benzyl maleate, oleyl maleate and stearyl maleate; and mixed salts or basic salts thereof.

Examples of the plasticizer include ester-type plasticizers such as phthalic ester plasticizer, adipic ester plasticizer, etc., as well as polyester plasticizer, phosphoric ester plasticizer, chlorine-containing plasticizer, tetrahydrophthalic acid plasticizer, azelaic acid plasticizer, sebacic acid plasticizer, stearic acid plasticizer, citric acid plasticizer, trimeritic acid plasticizer, etc.

Examples of the phthalic ester plasticizer include dibutyl phthalate, butylhexyl phthalate, diheptyl phthalate, dioctyl phthalate, diisononyl phthalate, diisodecyl phthalate, dilauryl phthalate, dicyclohexyl phthalate, dioctyl terephthalate, etc..

Examples of the adipic ester plasticizer include dioctyl adipate, diisononyl adipate, diisodecyl adipate, di(butyldiglycol) adipate, etc.

Examples of the phosphoric ester plasticizer include triphenyl phosphate, tricresyl phosphate, trixylenyl phosphate, tri(isopropylphenyl) phosphate, triethyl phosphate, tributyl phosphate, trioctyl phosphate, tri(butoxyethyl) phosphate, octyl diphenyl phosphate, etc.

Examples of the polyester plasticizer include those polyesters obtained by using a polyhydric alcohol such as ethylene glycol, diethylene glycol, triethylene glycol, 1,2-propylene glycol, 1,3-propylene glycol, 1,3-butane diol, 1,4-butane diol, 1,5-hexane diol, 1,6-hexane diol or neopentyl glycol, and a dibasic acid such as oxalic acid, malonic acid, succinic acid, glutaric acid, adipic acid, pimelic acid, suberic acid, azelaic acid, sebacic acid, phthalic acid, isophthalic acid or terephthalic acid, and, as required, using a monohydric alcohol or monocarboxylic acid as a stopper.

Examples of the initial coloration improving agent include nitrogen-containing compounds such as β-aminochrotonic ester, 2-phenylindole, diphenylurea, melamine, dihydropyridine, triazine, isocyanuric acid derivatives, etc.

Examples of the alcohols and/or partial esters thereof include pentaerythritol, dipentaerythritol, sorbitol, mannitol, trimethylolpropane, ditrimethylolpropane, pentaerythritol or dipentaerythritol, or partial esters of stearic acid thereof, bis(dipentaerythritol) adipate, glycerin, diglycerin, tris(2-hydroxyethyl) isocyanulate, polyethylene glycols, stearyl alcohol, etc.

The antioxidizing agent may be phenol-type antioxidizing agent, sulfur-type antioxidizing agent or phosphite-type oxidizing agent.

Examples of the phenol-type antioxidizing agent include 2,6-di-tert-butyl-p-cresol, 2,6-diphenyl-4-octadecyloxyphenol, stearyl(3,5-di-tert-butyl-4-hydroxyphenyl) propionate, distearyl (3,5-di-tert-butyl-4-hydroxybenzyl) phosphonate, neodiethylene glycol bis[(3,5-di-tert-butyl-4-hydroxyphenyl) propionate], 1,6-hexamethylene bis[(3,5-di-tert-butyl-4-hydroxyphenyl) propionate], 1,6-hexamethylene bis [(3,5-di-tert-butyl-4-hydroxyphenyl) propionic acid amide], 4,4'-thio bis(6-tert-butyl-m-cresol), 2,2'-methylene bis(4-methyl-6-tert-butylphenyl), 2,2-methylene bis(4-ethyl-6-tert-butyl phenol), bis[3,3-bis(4-hydroxy-3-tert-butylphenyl) butylic acid] glycol ester, 4,4'-butylidene bis(6-tert-butyl-m-cresol), 2,2'-ethylidene bis(4,6-di-tert-butyl phenol), 2,2'-ethylidene bis(4-sec-butyl-6-tert-butylphenyl), 1,1,3-tris(2-methyl-4-hydroxy-5-tert-butylphenyl) butane, bis[2-tert-butyl-4-methyl-6-(2-hydroxy-3-tert-butyl-5-methylbenzyl)phenyl] terephthalate, 1,3,5-tris(2,6-dimethyl-3-hydroxy-4-tert-butylbenzyl) isocyanulate, 1,3,5-tris(3,5-di-tert-butyl-4-hydroxybenzyl) isocyanulate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl] isocyanulate, tetrakis[methylene-3-(3,5-di-tert-butyl-4-hydroxyphenyl)propionate] methane, 2-tert-butyl-4-methyl-6-(2-acryloyloxy-3-tert-butyl-5-methylbenzyl) phenol, 3,9-bis[1,1-dimethyl-2-{(3-tert-butyl-4-hydroxy-5-methylphenyl)propionyloxy}ethyl]-2,4,8,10-tetraoxaspiro [5,5] undecane, triethylene glycol bis{(3-tert-butyl-4-hydroxy-5-methylphenyl) propionate], etc.

Examples of the sulfur-type antioxidizing agent include dialkylthiodipropionates such as dilauryl thiodipropionate, dimyristyl, distearyl, etc. and poly β-alkylmercaptopropionic esters such as pentaerythritol tetra(β-dodecylmercaptopropionate, etc.

Examples of the phosphite-type antioxidizing agent include tris(nonylphenyl) phosphite, tris(2,4-di-tert-butylphenyl) phosphite, tris[2-tert-butyl-4-(3-tert-butyl-4-hydroxy-5-methylphenylthio)-5-methylphenyl] phosphite, tridecyl phosphite, octyldiphenyl phosphite, di(decyl) monophenyl phosphite, monodecyldiphenyl phosphite, mono(dinonylphenyl)bis(nonylphenyl) phosphite, di(tridecyl)pentaerythritol diphosphite, distearylpentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl) pentaerythritol diphosphite, tetra(tridecyl)isopropylidene diphenol diphosphite, tetra($C_{12-15}$ mixed alkyl)-4,4'-n-butylidene bis(2-tert-butyl-5-methylphenol) diphosphite, hexa (tridecyl)-1,1,3-tris(2-methyl-4-hydroxy-5-tert-butylphenyl) butane triphosphite, tetrakis(2,4-di-tert-butylphenyl) biphenylene diphosphonite, 2,2'-methylene bis (4,6-di-tert-butylphenyl)(octyl) phosphite, etc.

The organic phosphite compound also works as an initial coloration improving agent and a heat stabilizer. In the present invention, what can be particularly effectively used are diphenyldecyl phosphite, tris(nonylphenyl) phosphite, tridecyl phosphite, tris(2-ethylhexyl) phosphite, tributyl phosphite, dilauryl acid phosphite, dibutyl acid phosphite, tris(dinonylphenyl) phosphite, trilaurylthio phosphite, trilauryl phosphite, bis(neopentylglycol)-1,4-cyclohexanedimethyl phosphite, distearylpentaerythritol diphosphite, diphenyl acid phosphite, tetradecyl-1,1,3-tris (2'-methyl-5'-tert-butyl-4'-hydroxyphenyl) butane diphosphite, tetra($C_{12-15}$ mixed alkyl)-4,4'-isopropylidenediphenyl diphosphite, tris(4-hydroxy-2,5-di-tert-butylphenyl) phosphite, tris(mono, di-mixed nonylphenyl) phosphite, hydrogenated-4,4'-isopropylidenediphenol polyphosphite, diphenyl bis[4,4'-n-butylidene bis(2-tert-butyl-5-methylphenol)]thiodiethanol diphosphite, bis (octylphenyl) bis[4,4'-n-butylidene bis(2-tert-butyl-5-methylphenyl)]thiodiethanol diphosphite, bis (octylphenyl) bis[4,4'-n-butylidene bis(2-tert-butyl-5-methylphenyl)]-1,6-hexanediol diphosphite, phenyl-4,4'-isopropylidenediphenol pentaerythritol diphosphite, phenyldiisodecyl phosphite, tetratridecyl(2-tert-butyl-5-methylphenol) diphosphite, tris(2,4-di-tert-butylphenyl) phosphite, etc.

The photo stabilizer may be a hindered amine photo stabilizer, such as 2,2,6,6-tetramethyl-4-piperidyl stearate, 1,2,2,6,6-pentamethyl-4-piperidyl stearate, 2,2,6,6-tetramethyl-4-piperidyl benzoate, N-(2,2,6,6-tetramethyl-4-piperidyl)dodecyl succinic acid imide, 1-[(3,5-di-tert-butyl-4-hydroxyphenyl)propionyloxyethyl]-2,2,6,6-tetramethyl-4-piperidyl-(3,5-di-tert-butyl-4-hydroxyphenyl) propionate, bis(2,2,6,6-tetramethyl-4-piperidyl) sebacate, bis(1,2,2,6,6-pentamethyl-4-piperidyl) sebacate, bis(1,2,2,6,6- pentamethyl-4-piperidyl)-2-butyl-2-(3,5-di-tert-butyl-4-hydroxybenzyl) malonate, N,N'-bis(2,2,6,6-tetramethyl-4-piperidyl)hexamethylene diamine, tetra(2,2,6,6-tetramethyl-4-piperidyl)butane tetracarboxylate, tetra(1,2,2,6,6-pentamethyl-4-piperidyl) butane tetracarboxylate, bis(2,2,6,6-tetramethyl-4-piperidyl)-di(tridecyl)butane tetracarboxylate, bis(1,2,2,6,6-pentamethyl-4-piperidyl)-di(tridecyl) butane tetracarboxylate, 3,9-bis[1,1-dimethyl-2-{tris(2,2,6,6-tetramethyl-4-piperidyloxycarbonyloxy) butylcarbonyloxy}ethyl]-2,4,8,10-tetraoxaspiro[5,5] undecane, 3,9-bis[1,1-dimethyl-2-{tris(1,2,2,6,6-pentamethyl-4-piperidyloxycarbonyloxy) butylcarbonyloxy}ethyl]-2,4,8,10-tetraoxaspiro[5,5] undecane, 1,5,8,12-tetrakis[4,6-bis{N-(2,2,6,6-tetramethyl-4-piperidyl)butylamino}-1,3,5-triazine-2-yl]-1,5,8,12-tetraazadodecane, 1-(2-hydroxyethyl)-2,2,6,6-tetramethyl-4-piperidinol/dimethyl succinate condensate, 2-tert-octylamino-4,6-dichloro-s-triazine/N,N'-bis(2,2,6,6-tetramethyl-4-piperidyl)hexamethylene diamine condensate, N,N'-bis(2,2,6,6-tetramethyl-4-piperidyl) hexamethylene diamine/dibromoethane condensate, etc.

Examples of the nucleating agent include aluminum-p-tert-butyl benzoate, dibenzilidene sorbitol, bis(4-methylbenzilidene) sorbitol, sodium bis(4-tert-butylphenyl) phosphate, sodium 2,2'-methylene bis(4,6-di-tert-butylphenyl) phosphate, etc.

The epoxy compound is used not only as a stabilizer but also as a plasticizer, and its examples include epoxylated soybean oil, epoxylated linseed oil, epoxylated fish oil, epoxylated tung oil, fatty acid ester of epoxylated tall oil, epoxylated beef tallow, epoxylated castor oil, expoxylated sufflower oil, fatty acid ester of epoxylated linseed oil (fatty acid butyl of epoxylated linseed oil, etc.), epoxylated stearic ester (epoxystearate of methyl, butyl, 2-ethylhexyl or stearyl), tris(epoxypropyl) isocyanulate, 3-(2-xenoxy)-1,2-epoxypropane, epoxylated polybutadiene, bisphenol-A diglycidyl ether, vinylcyclohexene diepoxide, dicyclopentadiene diepoxide, 3,4-epoxycyclohexyl-6-methylepoxycyclohexane carboxylate, etc.

Examples of the β-diketone compound include dehydroacetic acid, 1,3-cyclohexadion, methylenebis-1,3-cyclohexadion, 2-benzyl-1,3-cyclohexadion, acetyltetralon, palmitoyltetralon, stearoyltetralon, benzoyltetralon, 2-acetylcyclohexanone, 2-benzoylcyclohexanone, 2-acetyl-1,3-cyclohexadion, benzoyl-p-chlorobenzoylmethane, bis(4-methylbenzoyl)methane, bis(2-hydroxybenzoyl) methane, benzoylacetone, tribenzoylmethane, diacetylbenzoylmethane, stearoylbenzoylmethane, palmitoylbenzoylmethane, lauroylbenzoylmethane, dibenzoylmethane, bis(4-chlorobenzoyl)methane, bis(methylene-3,4-dioxybenzoyl)methane, bis(methylene-3,4-dioxybenzoyl)methane, benzoylacetylphenylmethane, stearoyl(4-methoxybenzoyl)methane, butanoylacetone, distearoylmethane, bis(4-chlorobenzoyl)methane, bis(methylene-3,4-dioxybenzoyl)methane, bis(methylene-3,4-dioxybenzoyl)methane, benzoylacetylphenylmethane, stearoyl(4-methoxybenzoyl)methane, butanoylacetone, distearoylmethane, acetylacetone, stearoylacetone, bis (cyclohexanoyl)methane, dipivaloylmethane, etc. Their metal salts are also useful.

Examples of the β-keto ester include acetoacetic esters such as methyl acetoacetate, ethyl acetoacetate, and propyl acetoacetate; propionylacetic esters such as methyl propionylacetate, and ethyl propionylacetate; and benzoylacetic esters such as methyl benzoylacetate and butyl benzoylacetate. The most preferred example is the acetoacetic ester.

Examples of the lubricating agent may be (a) those of the type of hydrocarbons, such as fluidizing, natural or synthetic paraffin, microwax, polyethylene wax, chlorinated polyethylene wax, etc., (b) those of the type of fatty acid such as stearic acid, lauric acid, etc., (c) those of the type of fatty acid monoamide or bisamide, such as amide stearate, amide palmitate, amide oleate, amide n-decylate, methylenebisstearoamide and ethylenebisstearoamide, (d) those of the ester type such as butyl stearate, cured castor oil, ethylene glycol monostearate, etc., (e) those of the type of alcohol such as cetyl alcohol, stearyl alcohol, etc., (f) metal soaps such as lead stearate, calcium stearate, etc., and (g) a mixture system thereof. Among them, it is particularly desired to use those of the type of fatty acid monoamide or bisamide.

EXAMPLES

In the following Examples, the starting materials and the formed products were measured in compliance with the following methods.

(1) X-ray diffraction.

Measured by using Geigerflex RAD-1B manufactured by Rigaku Denki Co., using Cu-Kα.

Target: Cu
Filter: Curved crystalline graphite monochrometer
Detector: Scintillation counter
Voltage: 40 KV
Current: 30 mA
Count full-scale: 700 c/s
Smoothing point: 25
Scanning speed: 1°/min.
Step sampling: 0.02°
Slit: DS1°RS0.15 mm SS1°
Irradiation angle: 6°

In particular, CSH-1 and ZCSH-1 which are the reaction products of the present invention were judged relying upon the reduction or extinction of the diffraction peak of $Ca(OH)_2$ or ZnO and upon the formation of a diffraction peak that was detected substantially solely at 3.0 to 3.1 angstroms.

(2) Infrared-ray absorption spectrum.

Light absorbancy of transmitted light was measured by using a TGS sensor, Model FTIR 8000, manufactured by Nihon Bunko Co.

The samples were formed using a KBr powder in the form of wafers, and light absorbancy was measured in the air of a relative humidity of 45% with the KBr wafer without containing sample as a reference.

In particular, the presence of fat or oil in the reaction system was judged relying upon the absorption of stretching vibration at 1750 to 1717 $cm^{-1}$ due to the carbonyl group of esters.

Formation of metal soaps which are the hydrolyzed products of fat or oil was judged relying upon the absorption peaks of asymmetrical stretching vibration at 1610 to 1550 $cm^{-1}$ and symmetrical stretching vibration at 1420 to 1300 $cm^{-1}$ due to the carboxyl group.

(3) Differential thermal analysis and measurement of moisture re-absorption rate.

The reaction product after the dehydration upon heating was measured for its moisture absorption rate by using a system SSC-5200TG-DTA manufactured by Seiko Denshi Kogyo Co. and using a standard substance $\alpha\text{-}Al_2O_3$. First, about 20 mg of the sample was heated up to about 190° C. at a heating rate of 20° C./min., held at this temperature for 30 minutes and was then allowed to cool naturally, in order to measure the amount of moisture re-absorption after 25 hours have passed from the start of cooling.

Amount of reduction of water due to heating (reading of TG, % by weight)=A

Reading of TG after 25 hours (% by weight)=B

Moisture re-absorption rate (%) C=100(A−B)/A

Amount of moisture re-absorption (amount of water absorbed per 100 g of the heated sample, g/100 g)

D=100 AC/(100−A)

(4) Liquid chromatography.

Solvents extracted by high-speed liquid chromatography manufactured by Shimazu Mfg. Co., Chromatopack C-R4A column and Shordex GPC KF801 Soxhlet were used as samples, and the saponified products were identified by using a differential refractometer.

(5) Chemical analysis.

Conducted in compliance with the chemical analysis of lime stipulated under JIS R9011.

(6) Number average particle diameter.

By using a scanning electron microscope WET-SEM (WS-250) manufactured by Akashi Beam Technology Co., particle diameters (μm) in a limited field image were arithmetically averaged to find an average particle diameter.

(7) Apparent specific weight.

Measured in compliance with JIS K-6220.

(8) Specific surface area.

Measured by using Poralograph Micromeridex Autopore 9220 manufactured by Shimaze Mfg. Co.

(9) Coefficient of water absorption.

The sample that was solidified upon being heated to vaporize water was left to cool in a silica gel desiccator, and was then introduced into a desiccator containing an aqueous solution of saturated potassium chloride maintained at 25° C., and was kept at a relative humidity of 85% for 48 hours in order to measure the coefficient of water absorption [% by weight] of the sample.

(10) Amount of oil absorption.

Measured in compliance with JIS K-5101-19.

(11) Fluorescent X-ray analysis.

Metals, Zn, Ca and Si in the formed products were identified by using an analyzer, SEA2001L, manufactured by Seiko Denshi Kogyo Co.

(Preparation of a calcium silica composite hydroxide [CSH-1])

Two liters of ion-exchanged water, 127.7 g of a siliceous compound (amorphous silica, 55% by weight; crystalline silica, 39% by weight; specific surface area, 120 $m^2/g$) having an average particle diameter of 5.0 μm, and 190 g of calcium hydroxide ($Ca(OH)_2$ content of 99.9%) were thrown into a 15-liter magnetic ball mill (having an inner diameter of 25 cm and a length of 30 cm) filled with 5 liters of a pulverizing medium consisting of alumina balls having diameters of from 10 to 20 mm. The mill was rotated at room temperature at a speed of 60 rpm for 60 hours in order to obtain a homogeneous slurry (sample A-1) of a calcium silica composite hydroxide having pH of from 12.5 to 13.0 in the presence of unreacted calcium hydroxide. Identification was carried out relying upon X-ray diffraction. The results were as shown in FIG. 1.

(Preparation of a zinc calcium silica composite hydroxide [ZCSH-1])

Two liters of ion-exchanged water, 127.7 g of a siliceous compound (amorphous silica, 55% by weight; crystalline silica, 39% by weight; specific surface area, 120 $m^2/g$) having an average particle diameter of 5.0 μm, 190 g of calcium hydroxide ($Ca(OH)_2$ content of 99.9%), and 31 g of zinc oxide (ZnO content of 99.9%) were thrown into a 15-liter magnetic ball mill (having an inner diameter of 25 cm and a length of 30 cm) filled with 5 liters of a pulverizing medium consisting of alumina balls having diameters of from 10 to 20 mm. The mill was rotated at room temperature at a speed of 60 rpm for 60 hours in order to obtain a homogeneous slurry (sample B-1) of a zinc calcium silica composite hydroxide having pH of from 12.5 to 13.0 in the presence of unreacted calcium hydroxide. Identification was carried out relying upon X-ray diffraction. The results were as shown in FIG. 1.

(Preparation of lead silicate [PbSH])

Figure 3:
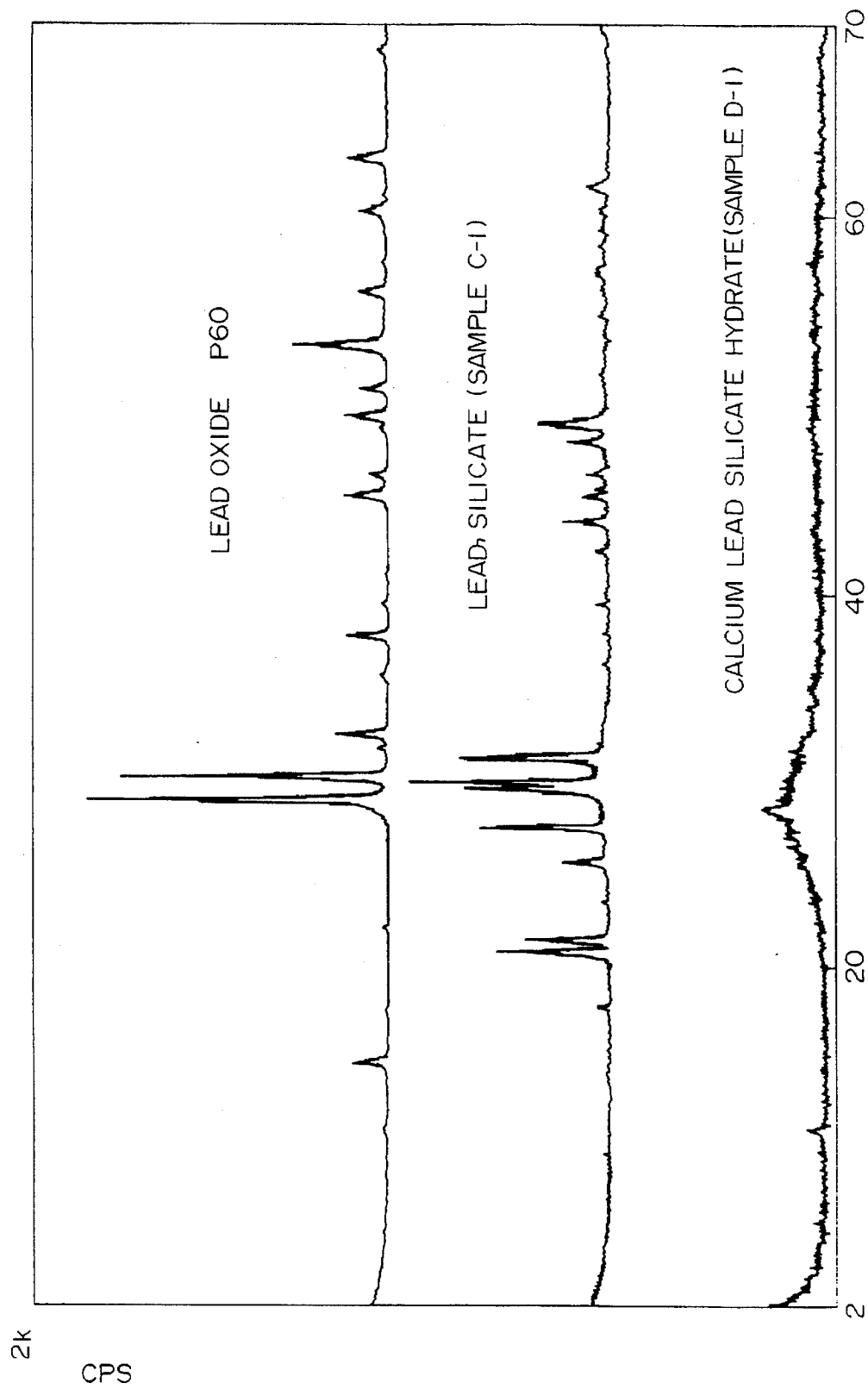
FIG. 3 is a diagram of X-ray diffraction spectra of a lead silicate (PbSH: sample C-1), a calcium lead silicate hydrate (PbCSH: sample D-1) and a led oxide PbO of comparative example.

Two liters of ion-exchanged water, 513.6 g of lead oxide PbO, and 80.4 g of a siliceous compound (amorphous silica, 85.8%; specific surface area, 180 $m^2/g$) having an average particle diameter of 5.0 μm were thrown into a 15-liter magnetic ball mill (having an inner diameter of 25 cm and a length of 30 cm) filled with 5 liters of a pulverizing medium consisting of alumina balls having diameters of from 10 to 20 mm. The mill was rotated at room temperature at a speed of 60 rpm for 60 hours, and the obtained slurry was transferred into a 5-liter beaker, and was stirred under the heated condition for 3 hours to obtain a white slurry (sample C-1). The obtained sample was identified relying upon the X-ray diffraction. The X-ray diffraction spectra were as shown in FIG. 3.

(Preparation of a calcium lead silicate hydrate [PbCSH])

A white slurry (sample D-1) of a calcium lead composite hydroxide was obtained in the same manner as the above-mentioned sample C-1 with the exception of thrawing 2 liters of ion-exchanged water, 513.6 g of lead oxide, 80.4 g of a siliceous compound (amorphous silica, 85.8%; specific surface area, 180 $m^2/g$) having an average particle diameter of 5.0 μm, and 8.5 g of calcium hydroxide having a purity of 99.9%. The obtained sample was identified relying upon the X-ray diffraction. The X-ray diffraction spectra were as shown in FIG. 3.

Example 1

To the slurry of the sample B-1 was added 80 g of a rape oil having a saponification value of 173 in order to carry out the hydrolysis of fat or oil under the grinding condition at room temperature, at 60 rpm and for 15 hours and to carry out the reaction of the zinc calcium silica composite oxide, and the saponification reaction of fat or oil was completed in the presence of unreacted calcium hydroxide. Completion of the saponification reaction was determined by analyzing the infrared-ray spectrum.

By adding 51.3 g of an active silicate powder having an average particle diameter of 5.0 μm, furthermore, the mill was rotated for 5 hours. Then, the slurry formed by the reaction was taken out and was solidified upon heating under reduced pressure to vaporize water, in order to obtain 450 g of a dry product.

Chemical analysis and thermal analysis proved that the product contained 354 g of a zinc calcium silica composite hydroxide and 96 g of a saponified product. Table 1 shows measured properties of the fat or oil-saponified product composite ZCSH-1 (sample H-1), Tables 2 and 3 show properties of when it was blended into hard and soft PVCs, and FIG. 2 shows the change of TG (%) upon the passage of time.

Example 2

An oil and fat-saponified product composite ZCSH-1 was obtained through the same reaction and the same identification as those of Example 1 but using 80 g of soybean oil having a saponification value of 194 as starting fat or oil. Table 1 shows properties of the fat or oil-saponified product composite ZCSH-1 (sample H-2), and Tables 2 and 3 show properties of when it was blended into hard and soft PVCs.

Example 3

An oil and fat-saponified product composite ZCSH-1 was obtained through the same reaction and the same identification as those of Example 1 but using 80 g of rice bran oil having a saponification value of 185 as starting fat or oil. Table 1 shows properties of the fat or oil-saponified product composite ZCSH-1 (sample H-3), and Tables 2 and 3 show properties of when it was blended into hard and soft PVCs.

Example 4

An oil and fat-saponified product composite ZCSH-1 was obtained through the same reaction and the same identification as those of Example 1 but using 80 g of palm oil having a saponification value of 203 as starting fat or oil. Table 1 shows properties of the fat or oil-saponified product composite ZCSH-1 (sample H-4), and Tables 2 and 3 show properties of when it was blended into hard and soft PVCs.

Example 5

An oil and fat-saponified product composite ZCSH-1 was obtained through the same reaction and the same identification as those of Example 1 but using 80 g of fish oil having a saponification value of 190 as starting fat or oil. Table 1 shows properties of the fat or oil-saponified product composite ZCSH-1 (sample H-5), and Tables 2 and 3 show properties of when it was blended into hard and soft PVCs.

Example 6

An oil and fat-saponified product composite ZCSH-1 was obtained through the same reaction and the same identification as those of Example 1 but using 80 g of beef tallow having a saponification value of 214 as starting fat or oil. Table 1 shows properties of the fat or oil-saponified product composite ZCSH-1 (sample H-6), and Tables 2 and 3 show properties of when it was blended into hard and soft PVCs.

Example 7

An oil and fat-saponified product composite ZCSH-1 (sample H-7) was obtained by using the same starting materials and through the same operation as those of Example 1 but using 10 g of rape oil having a saponification value of 173 as starting fat or oil. Table 1 shows properties of the product, and Tables 2 and 3 show properties of when it was blended into hard and soft PVCs.

Example 8

An oil and fat-saponified product composite ZCSH-1 was obtained by using the same starting materials and through the same operation as those of Example 1 but using 300 g of rape oil having a saponification value of 173 as starting fat or oil and 258.5 g of calcium hydroxide (having a purity of 99.9%). Table 1 shows properties of the product (sampel H-8), and Tables 2 and 3 show properties of when it was blended into hard and soft PVCs.

Example 9

200 Grams of active clay, i.e., waste clay (content of reactive silicic acid is 67.5% by weight in the waste clay) containing 40.0% by weight of rape oil (having a saponification value of 150) that has been decored and 60.0% by weight of active clay ($SiO_2$, 77.0% by weight), 176.4 g of calcium hydroxide (having a purity of 99.9%) and 2 liters of ion-exchanged water, were fed into the same ball mill as that of Example 1, which was rotated at 60 rpm for 65 hours to execute the grinding reaction and to obtain a homogeneous slurry having a pH of 12.6.

To the slurry was further added 73.5 g of an active silicic acid powder (containing 10% of water and having a purity of 94.6% by weight) having an average particle diameter of 5.0 μm, and the ball mill was rotated for another 15 hours to obtain a homogeneous slurry having a pH of 11.8. The slurry was solidified upon heating to vaporize water, in order to obtain 450.5 g of a dry product.

Analysis indicated that the product (sample H-9) contained 362.4 g of a calcium silica composite hydroxide containing active clay and 88.1 g of a saponified product. Table 1 shows properties of the product, and Tables 2 and 3 show properties of when it was blended into hard and soft PVCs.

Example 10

200 Grams of active clay, i.e., beef tallow-refined waste clay (content of reactive silicic acid is 63.4% by weight in the waste clay) containing 39.4% by weight of beef tallow (having a saponification value of 214) that has been decolored and 60.6% by weight of active clay ($SiO_2$, 74.8% by weight), 148 g of calcium hydroxide (having a purity of 99.9%) and 2 liters of ion-exchanged water, were fed into the same ball mill as that of Example 1, which was rotated at 60 rpm for 65 hours to execute the grinding reaction and to obtain a homogeneous slurry having a pH of 12.8.

To the slurry was further added 48.0 g of an active silicic acid powder (containing 10% of water and having a purity of 94.6% by weight) having an average particle diameter of 5.0 μm, and the ball mill was rotated for another 15 hours to obtain a homogeneous slurry having a pH of 12.1. Operation was then carried out in the same manner as in Example 9.

Analysis indicated that the product (sample H-10) contained 297.6 g of a calcium silica composite hydroxide containing active clay and 90.2 g of a saponified product. Table 1 shows properties of the product, and Tables 2 and 3 show properties of when it was blended into hard and soft PVCs.

Example 11

150 Grams of acidic clay ($SiO_2$, 70.3% by weight) composed chiefly of montmorillonite which is an aluminosilicate, 166.5 g of calcium hydroxide having a purity of 99.9%, and 80 g of soybean oil having a saponification value of 194, were thrown together with 2 liters of ion-exchanged water into the same ball mill as that of Example 1, which was rotated at 60 rpm for 60 hours. Then, 69.3 g (containing 10% of water) of an active silicic acid powder having an average particle diameter of 5.0 μm was added thereto, and the ball mill was rotated for another 15 hours to obtain a homogeneous slurry having a pH of 12.1, and the operation was further carried out in the same manner as in Example 1. Analysis indicated that the product (sample H-11) contained 370.0 g of a calcium silica composite hydroxide containing active clay and 90.6 g of a saponified product. Table 1 shows properties of the product, and Tables 2 and 3 show properties of when it was blended into hard and soft PVCs.

Example 12

Zeolite 4A which is an aluminosilicate was immersed in 6N hydrochloric acid the whole day and night, washed with water to a sufficient degree, and was dried and pulverized to obtain an active silicic acid powder having an average particle size of 15.0 μm, a specific surface area of 280 m²/g and a purity of 94.3%.

The operation was carried out in the same manner as in Example 1 but using 127.3 g of an active silicic acid powder and 100 g of palm oil having a saponification value of 203. Analysis indicated that the product (sample H-12) contained 360 g of a zinc calcium silica composite hydroxide and 100.3 g of a saponified product. Table 1 shows properties of the product, and Tables 2 and 3 show properties of when it was blended into hard and soft PVCs.

Example 13

128 Grams of an activie silicic acid powder (water content, 10%; $SiO_2$ purity, 96.5%) having an average particle diameter of 5.0 μm, 193.1 g of calcium hydroxide having a purity of 99.9%, 10 g of fish oil having a saponification value of 190, and 2 liters of ion-exchanged water, were fed into the same ball mill as that of Example 1, which was rotated at 60 rpm for 60 hours to carry out the reaction under the grinding condition. Then, 72 g of the active silicic acid powder was fed again into the ball mill, reacted for 24 hours under the grinding condition to neutralize excess of alkali, thereby to obtain a composite product (sample H-13) containing 367.1 g of a calcium silica composite hydroxide and 10.6 g of a saponified product. Table 1 shows properties of the product, and Tables 2 and 3 show properties of when it was blended into hard and soft PVCs.

Example 14

180 Grams of an activie silicic acid powder (water content, 10%; $SiO_2$ purity, 96.5%) having an average particle diameter of 5.0 μm, 193.1 g of calcium hydroxide having a purity of 99.9%, 148.3 g of zinc oxide having a purity of 99.0%, 20 g of fish oil having a saponification value of 190, and 2 liters of ion-exchanged water, were fed into the same ball mill as that of Example 1, which was rotated at 60 rpm for 60 hours to carry out the reaction under the grinding condition. Then, 20 g of the active silicic acid powder was fed again into the ball mill, reacted for 24 hours under the grinding condition to neutralize excess of alkali, thereby to obtain a composite product (sample H-14) containing 593 g of a zinc calcium silica composite hydroxide and 23.9 g of a saponified product. Table 1 shows properties of the product, and Tables 2 and 3 show properties of when it was blended into hard and soft PVCs.

Example 15

15.3 Grams of an activie silicic acid powder (water content, 10%; $SiO_2$ purity, 96.5%) having an average particle diameter of 5.0 μm, 60.8 g of calcium hydroxide having a purity of 99.9%, and 1.5 liters of ion-exchanged water, were fed into the same ball mill as that of Example 1, which was rotated at 60 rpm for 20 hours under the grinding condition.

Then, 200 g of rape oil having a saponification value of 173 was added thereto, and the ball mill was rotated at 60 rpm under the grinding condition for 50 hours to complete the saponification reaction. Moreover, 20.1 g of the active silicic acid powder was fed again into the ball mill, reacted for 24 hours under the grinding condition to neutralize excess of alkali, thereby to obtain a composite product (sample H-15) containing 63.2 g of a calcium silica composite hydroxide and 235.4 g of a saponified product. Table 1 shows properties of the product, and Tables 2 and 3 show properties of when it was blended into hard and soft PVCs.

Comparative Example 1

Table 1 shows properties of the powder of zeolite 4A (sample HT-1), and Tables 2 and 3 show properties of when it was blended into hard and soft PVCs.

Comparative Example 2

Table 1 shows properties of the powder of active clay (sample HT-2), and Tables 2 and 3 show properties of when it was blended into hard and soft PVCs.

Comparative Example 3

Table 1 shows properties of the powder of calcium silicate CSH-1 (sample HT-3), and Tables 2 and 3 show properties of when it was blended into hard and soft PVCs.

Comparative Example 4

400 Grams of zeolite 4A, 200 g of calcium stearate and 58 g of glycerin were fed into a 10-litter super-mixer manufactured by Kawada Mfg. Co., which was rotated at 800 rpm for 3 minutes to mix them together in order to obtain a sample HT-4. Tables 2 and 3 show properties of when the sample was blended into hard and soft PVCs.

Comparative Example 5

400 Grams of active clay, 200 g of calcium stearate and 58 g of glycerin were fed into a 10-litter super-mixer manufactured by Kawada Mfg. Co., which was rotated at 800 rpm for 3 minutes to mix them together in order to obtain a sample HT-5. Tables 2 and 3 show properties of when the sample was blended into hard and soft PVCs.

Comparative Example 6

1600 Grams of calcium silicate (CSH-1), 300 g of calcium stearate and 170 g of glycerin were fed into a 10-litter super-mixer manufactured by Kawada Mfg. Co., which was rotated at 800 rpm for 3 minutes to mix them together in order to obtain a sample HT-6. Tables 2 and 3 show properties of when the sample was blended into hard and soft PVCs.

Comparative Example 7

1600 Grams of calcium silicate (CSH-1) and 300 g of calcium stearate were fed into a 10-litter super-mixer manufactured by Kawada Mfg. Co., which was rotated at 800 rpm for 3 minutes to mix them together in order to obtain a sample HT-7. Tables 2 and 3 show properties of when the sample was blended into hard and soft PVCs.

TABLE 1

| Sample name | Sample No. | Saponified product content (% by wt.) | Average particle diameter (μm) | Porous area (m²/g) | Oil-absorbing amount (ml/100 g) | Amount of moisture re-absorption (g/100 g) | Coefficient of water absorption (% by wt.) |
|---|---|---|---|---|---|---|---|
| Eamp.1 | H-1 | 22.5 | 1.5 | 35 | 84.9 | 1.6 | 1.2 |
| Exam.2 | H-2 | 21 | 1.5 | 38 | 88.3 | 1.4 | 1.5 |
| Exam.3 | H-3 | 21.2 | 1.5 | 36 | 87.9 | 1.4 | 1.1 |
| Eamp.4 | H-4 | 21.5 | 1.7 | 38 | 87.2 | 2 | 1.5 |
| Exam.5 | H-5 | 21.3 | 1.5 | 39 | 87.7 | 1.8 | 1.6 |
| Exam.6 | H-6 | 21.6 | 1.7 | 38 | 87.0 | 1.3 | 2 |
| Eamp.7 | H-7 | 3.2 | 1.5 | 220 | 128.7 | 3 | 2.2 |
| Exam.8 | H-8 | 50 | 1.5 | 5.3 | 22.5 | 0.7 | 0.5 |
| Exam.9 | H-9 | 19.6 | 1.5 | 13.5 | 59.4 | 1.8 | 1.6 |
| Eamp.10 | H-10 | 23.3 | 3 | 14.2 | 52.5 | 1.1 | 1 |
| Exam.11 | H-11 | 19.7 | 5 | 15 | 11.0 | 1.6 | 1.5 |
| Exam.12 | H-12 | 21.8 | 5 | 15.6 | 49.0 | 2.5 | 2.5 |
| Eamp.13 | H-13 | 0.5 | 1.5 | 285 | 142.8 | 3.7 | 3.5 |
| Exam.14 | H-14 | 2.4 | 5 | 240 | 130.6 | 3.5 | 1.6 |
| Exam.15 | H-15 | 89.6 | 550 | 4.2 | | 2 | 0 |
| Comp.Ex.1 | HT-1 | | 1.5 | 400 | 36.0 | 17.5 | 13.2 |
| Comp.Ex.2 | HT-2 | | 3 | 280 | 120.0 | 5.5 | 6.5 |
| Comp.Ex.3 | HT-3 | | 0.5 | 230 | 180.0 | 6.2 | 7.8 |
| Comp.Ex.4 | HT-4 | | | | | 12.5 | 8.8 |
| Comp.Ex.5 | HT-5 | | | | | 8.3 | 5.3 |
| Comp.Ex.6 | HT-6 | | | | | 8 | 5.6 |
| Comp.Ex.7 | HT-7 | | | | | 5.6 | 6.6 |

Note: Exam.: Example
Comp.Ex.: Comparative Example

TABLE 2

| Sample name | Sample No. | Thermal stability sustaining time (min) | | | | | | | | Non-foaming Property | Transparency (transmission factor %) | Dispersion | Charpy impact value (kg · cm/cm²) |
|---|---|---|---|---|---|---|---|---|---|---|---|---|---|
| | | 10 | 20 | 30 | 40 | 50 | 60 | 70 | 80 | | | | |
| Exam.1 | H-1 | no color | faint yellow | faint yellow | faint yellow | pale orange | pale orange | orange | orange | ◉ | 65 | good | 10.1 |
| Exam.2 | H-2 | no color | faint yellow | faint yellow | faint yellow | pale orange | pale orange | orange | orange | ◉ | 70 | good | 10.5 |
| Exam.3 | H-3 | no color | faint yellow | faint yellow | faint yellow | pale orange | pale orange | orange | orange | ◉ | 62 | good | 9.9 |
| Exam.4 | H-4 | no color | faint yellow | faint yellow | faint yellow | pale orange | pale orange | orange | orange | ◉ | 73 | good | 10.1 |
| Exam.5 | H-5 | no color | faint yellow | faint yellow | faint yellow | pale orange | pale orange | orange | orange | ◉ | 66 | good | 10 |
| Exam.6 | H-6 | no color | faint yellow | faint yellow | faint yellow | pale orange | pale orange | orange | orange | ◉ | 58 | good | 10.5 |
| Exam.7 | H-7 | no color | faint yellow | faint yellow | faint yellow | pale orange | pale orange | orange | orange | ◉ | 50 | good | 8.9 |
| Exam.8 | H-8 | no color | no color | faint yellow | faint yellow | pale orange | pale orange | orange | orange | ◉ | 78 | good | 11 |
| Exam.9 | H-9 | no color | faint yellow | faint yellow | pale orange | pale orange | orange | orange | dark brown | ◉ | 60 | good | 8.5 |
| Exam.10 | H-10 | no color | no color | faint yellow | pale orange | pale orange | orange | orange | dark brown | ◉ | 59 | good | 7.9 |
| Exam.11 | H-11 | no color | faint yellow | faint yellow | pale orange | pale orange | pale orange | orange | dark brown | ◉ | 55 | good | 9.4 |
| Exam.12 | H-12 | no color | faint yellow | faint yellow | faint yellow | pale orange | pale orange | orange | orange | ◉ | 66 | good | 8.8 |
| Exam.13 | H-13 | no color | faint yellow | pale orange | pale orange | pale orange | orange | orange | orange | ◉ | 60 | good | 8.5 |
| Exam.14 | H-14 | no color | no color | no color | faint yellow | pale orange | dark brown | | | ◉ | 55 | good | 8.5 |
| Exam.15 | H-15 | no color | faint yellow | pale orange | pale orange | orange | orange | dark brown | | ◉ | 80 | good | 10.1 |
| Comp. Exam.1 | HT-1 | faint yellow | pale orange | orange | orange | orange | orange | dark brown | | X | 25 | poor | 3.5 |
| Comp. Exam.2 | HT-2 | faint yellow | pale orange | pale orange | pale orange | orange | orange | dark brown | | X | 40 | poor | 4 |
| Comp. Exam.3 | HT-3 | faint yellow | pale orange | orange | orange | orange | orange | orange | orange | X | 50 | poor | 7 |
| Comp. | HT-4 | faint | pale | orange | orange | orange | orange | dark | | X | 30 | poor | 4 |

TABLE 2-continued

| Sample name | Sample No. | Thermal stability sustaining time (min) | | | | | | | | Non-foaming Property | Transparency (transmission factor %) | Dispersion | Charpy impact value (kg·cm/cm²) |
|---|---|---|---|---|---|---|---|---|---|---|---|---|---|
| | | 10 | 20 | 30 | 40 | 50 | 60 | 70 | 80 | | | | |
| Exam.4 | | yellow | orange | | | | | brown | | | | | |
| Comp. Exam.5 | HT-5 | faint yellow | pale orange | pale orange | pale orange | pale orange | orange | orange | dark brown | X | 45 | poor | 4.3 |
| Comp. Exam.6 | HT-6 | faint yellow | pale orange | orange | orange | orange | orange | orange | orange | X | 55 | poor | 6.1 |
| Comp. Exam.7 | HT-7 | faint yellow | pale orange | orange | orange | orange | orange | orange | orange | X | 55 | poor | 5.5 |

Note:
Exam.: Example
Comp.Exam.: Comparative Example
◎: excellent, X: poor

TABLE 3

| Sample name | Sample No. | Thermal stability sustaining time (min) | | | | | | | | Thermal Stability (Hcl removing time (min)) | Insulating property (vol. resistivity (×10¹³ Ωcm)) | Transparency (transmission factor %) |
|---|---|---|---|---|---|---|---|---|---|---|---|---|
| | | 15 | 30 | 45 | 60 | 75 | 90 | 105 | 120 | | | |
| Exam.1 | H-1 | no color | no color | faint yellow | faint yellow | pale orange | orange | orange | orange | 115 | 10.5 | 85 |
| Exam.2 | H-2 | no color | no color | faint yellow | faint yellow | pale orange | orange | orange | orange | 130 | 8.4 | 90 |
| Exam.3 | H-3 | no color | no color | faint yellow | faint yellow | pale orange | orange | orange | orange | 110 | 8 | 80 |
| Exam.4 | H-4 | no color | no color | faint yellow | faint yellow | pale orange | orange | orange | orange | 115 | 8.3 | 95 |
| Exam.5 | H-5 | no color | no color | faint yellow | faint yellow | pale orange | orange | orange | orange | 120 | 7.7 | 86 |
| Exam.6 | H-6 | no color | no color | faint yellow | faint yellow | pale orange | orange | orange | orange | 125 | 7.5 | 75 |
| Exam.7 | H-7 | no color | no color | faint yellow | faint yellow | pale orange | orange | orange | dark brown | 95 | 5.1 | 65 |
| Exam.8 | H-8 | no color | no color | faint yellow | faint yellow | faint yellow | pale orange | orange | dark brown | 100 | 7.7 | 97 |
| Exam.9 | H-9 | no color | faint yellow | faint yellow | faint yellow | pale orange | orange | dark brown | | 90 | 6.4 | 77 |
| Exam.10 | H-10 | no color | faint yellow | faint yellow | pale orange | pale orange | orange | orange | dark brown | 90 | 5 | 71 |
| Exam.11 | H-11 | no color | faint yellow | faint yellow | pale orange | pale orange | orange | dark brown | | 85 | 4.5 | 63 |
| Exam.12 | H-12 | no color | no color | faint yellow | faint yellow | pale orange | orange | orange | orange | 125 | 2.5 | 82 |
| Exam.13 | H-13 | no color | faint yellow | faint yellow | faint yellow | faint yellow | pale orange | orange | orange | 120 | 4.5 | 78 |
| Exam.14 | H-14 | no color | no color | no color | faint yellow | pale orange | orange | dark brown | | 70 | 5.3 | 69 |
| Exam.15 | H-15 | no color | no color | faint yellow | faint yellow | pale orange | pale orange | orange | dark brown | 100 | 2 | 92 |
| Comp. Exam.1 | HT-1 | faint yellow | faint yellow | pale orange | orange | orange | orange | orange | dark brown | 120 | 0.5 | 33 |
| Comp. Exam.2 | HT-2 | faint yellow | faint yellow | pale orange | orange | dark brown | | | | 50 | 0.8 | 50 |
| Comp. Exam.3 | HT-3 | faint yellow | faint yellow | faint yellow | pale orange | pale orange | orange | orange | dark brown | 115 | 0.75 | 65 |
| Comp. Exam.4 | HT-4 | faint yellow | faint yellow | pale orange | pale orange | orange | orange | dark brown | | 100 | 0.2 | 40 |
| Comp. Exam.5 | HT-5 | faint yellow | faint yellow | pale orange | orange | orange | dark brown | | | 70 | 0.25 | 59 |
| Comp. Exam.6 | HT-6 | faint yellow | faint yellow | pale orange | pale orange | orange | orange | orange | dark brown | 120 | 0.3 | 69 |
| Comp. Exam.7 | HT-7 | faint yellow | faint yellow | pale orange | orange | orange | orange | dark brown | | 110 | 0.5 | 73 |

Note:
Exam.: Example
Comp.Exam.: Comparative Example

Example 16

32 Grams of beef tallow having a saponification value of 214 was added to the slurry of the sample C-1, and the mixture was ground at room temperature at 60 rpm for 20 hours to complete the saponification reaction of fat or oil. The slurry was then solidified upon drying to vaporize water in order to obtain 622 g of a dry product. Completion of the saponification reaction was determined by the analysis of infrared-ray spectrum. Table 4 shows properties of the obtained fat or oil-saponified product composite PbSH (sample H-16), and Tables 5 and 6 show properties of when it was blended into hard and soft PVCs.

Example 17

420 Grams of beef tallow having a saponification value of 214 and 179 g of PbO were added to the slurry of the sample C-1, and the mixture was ground at room temperature at 60 rpm for 20 hours. The slurry was then heated until the sponification reaction of fat or oil was completed. The slurry was then solidified upon drying to vaporize water in order to obtain 1205 g of a dry product. Completion of the saponification reaction was determined by the analysis of infrared-ray spectrum. Table 4 shows properties of the obtained fat or oil-saponified product composite PbSH (sample H-17), and Tables 5 and 6 show properties of when it was blended into hard and soft PVCs.

Example 18

32 Grams of beef tallow having a saponification value of 214 was added to the slurry of the sample D-1, and the mixture was ground at room temperature at 60 rpm for 20 hours to complete the saponification reaction of fat or oil. The slurry was then solidified upon drying to vaporize water in order to obtain 625 g of a dry product. Completion of the saponification reaction was determined by the analysis of infrared-ray spectrum. Table 4 shows properties of the obtained fat or oil-saponified product composite PbCSH (sample H-18), and Tables 5 and 6 show properties of when it was blended into hard and soft PVCs.

Comparative Example 8

Table 4 shows properties of a powder of tribasic lead sulfate (Stabinex Tc produced by Mizusawa Kagaku Co., sample HT-8), and Tables 5 and 6 show properties of when it was blended into hard and soft PVCs.

Comparative Example 9

Table 4 shows properties of a powder of lead stearate (Stabinex NC18 produced by Mizusawa Kagaku Co., sample HT-9), and Tables 5 and 6 show properties of when it was blended into hard and soft PVCs.

Comparative Example 10

Table 4 shows properties of a powder of dibasic lead stearate (Stabinex C18 produced by Mizusawa Kagaku Co., sample HT-10), and Tables 5 and 6 show properties of when it was blended into hard and soft PVCs.

Comparative Example 11

Table 4 shows properties of a powder of dibasic lead phosphite (Stabinex D produced by Mizusawa Kagaku Co., sample HT-11), and Tables 5 and 6 show properties of when it was blended into hard and soft PVCs.

Comparative Example 12

Table 4 shows properties of a powder of lead silicate (Stabinex S produced by Mizusawa Kagaku Co., sample HT-12), and Tables 5 and 6 show properties of when it was blended into hard and soft PVCs.

TABLE 4

| Sample name | Sample No. | Saponified product content (% by wt.) | Average particle diameter (μm) | Porous area (m²/g) | Oil-absorbing amount (ml/100 g) |
|---|---|---|---|---|---|
| Example 16 | H-16 | 7.7 | 1.5 | 52 | 65.0 |
| Example 17 | H-17 | 51.8 | 200 | — | — |
| Example 18 | H-18 | 7.6 | 1.5 | 65 | 76.8 |
| Comparative Example 8 | HT-8 | — | 3.5 | 11 | 9.0 |
| Comparative Example 9 | HT-9 | — | 200 | — | — |
| Comparative Example 10 | HT-10 | — | 250 | — | — |
| Comparative Example 11 | HT-11 | — | 1.2 | 15 | 10.0 |
| Comparative Example 12 | HT-12 | — | 3.3 | 20 | 34.5 |

TABLE 5

| Sample name | Sample No. | Thermal stability sustaining time (min) | | | | | | | | Transparency (transmission factor %) | Dispersion | Charpy impact value (kg·cm/cm²) |
|---|---|---|---|---|---|---|---|---|---|---|---|---|
| | | 10 | 20 | 30 | 40 | 50 | 60 | 70 | 80 | | | |
| Exam.16 | H-16 | no color | no color | faint yellow | faint yellow | pale orange | pale orange | orange | orange | 32 | very good | 11 |
| Exam.17 | H-17 | no color | no color | no color | pale orange | orange | dark brown | | | 60 | very good | 12.3 |
| Exam.18 | H-18 | no color | no color | no color | faint yellow | pale orange | pale orange | pale orange | orange | 36 | very good | 10.5 |

TABLE 5-continued

| Sample name | Sample No. | Thermal stability sustaining time (min) | | | | | | | | Transparency (transmission factor %) | Dispersion | Charpy impact value (kg · cm/cm²) |
| --- | --- | --- | --- | --- | --- | --- | --- | --- | --- | --- | --- | --- |
| | | 10 | 20 | 30 | 40 | 50 | 60 | 70 | 80 | | | |
| Comp. Exam.8 | HT-8 | no color | faint yellow | faint yellow | faint yellow | pale orange | pale orange | orange | dark brown | 20 | good | 7.8 |
| Comp. Exam.9 | HT-9 | no color | no color | faint yellow | orange | dark brown | | | | 66 | good | 8.8 |
| Comp. Exam.10 | HT-10 | no color | no color | faint yellow | pale orange | pale orange | orange | dark brown | | 35 | good | 9.2 |
| Comp. Exam.11 | HT-11 | no color | faint yellow | faint yellow | pale orange | pale orange | orange | orange | dark brown | 22 | good | 8.9 |
| Comp. Exam.12 | HT-12 | no color | faint yellow | pale orange | pale orange | pale orange | orange | orange | dark brown | 23 | good | 7.5 |

TABLE 6

| Sample name | Sample No. | Thermal stability sustaining time (min) | | | | | | | | Thermal Stability (Hcl) removing time (min) | Insulating property (vol. resistivity) (×10¹³ Ωcm)) | Transparency (transmission factor %) |
| --- | --- | --- | --- | --- | --- | --- | --- | --- | --- | --- | --- | --- |
| | | 15 | 30 | 45 | 60 | 75 | 90 | 105 | 120 | | | |
| Exam.16 | H-16 | no color | no color | faint yellow | faint yellow | pale orange | pale orange | pale orange | orange | 300 | 10.5 | 55 |
| Exam.17 | H-17 | no color | no color | no color | faint yellow | pale orange | orange | dark brown | | 150 | 10.8 | 72 |
| Exam.18 | H-18 | no color | no color | faint yellow | faint yellow | faint yellow | pale orange | pale orange | pale orange | 310 | 12.5 | 60 |
| Comp. Exam.8 | HT-8 | no color | no color | faint yellow | faint yellow | pale orange | orange | orange | dark brown | 272 | 1.6 | 32 |
| Comp. Exam.9 | HT-9 | no color | no color | faint yellow | pale orange | pale orange | dark brown | | | 100 | 1.3 | 86 |
| Comp. Exam.10 | HT-10 | no color | no color | faint yellow | pale orange | pale orange | orange | dark brown | | 110 | 1 | 22 |
| comp. Exam.11 | HT-11 | no color | no color | faint yellow | pale orange | pale orange | orange | orange | dark brown | 250 | 2.3 | 35 |
| Comp. Exam.12 | HT-12 | no color | no color | faint yellow | faint yellow | pale orange | orange | orange | dark brown | 110 | 1.5 | 15 |

Examples 19 to 26 and Comparative Examples 13 to 16

A vinyl chloride resin (having an average polymerization degree of 1050), composite silicate A of saponified product of fat or oil (Example 10, sample H-10), composite silicate B of saponified product of fat or oil (Example 2, sample H-2), zinc stearate (Stabinex NT-Z1 produced by Mizusawa Kagaku Co.), dipentaerythritol (Dipentaerythritol 300 produced by Koei Kagaku Co.), dibenzoylmethane (Rodiastab 83 produced by Rhone Poulenc Co.), diphenyltridecyl phosphite (XR1518 produced by Borg Warner Co.), polyethylene wax (Hiwax 220MP produced by Mitui Sekiyu Kagaku Co.), hydrotalcite (DHT-4A produced by Kyowa Kagaku Co.), and zeolite 4A (Mizukalizer DS produced by Mizusawa Kagaku Co.) of predetermined amounts (unit in PHR) shown in Table 7, were fed into Henschel's mixer and were homogeneously mixed together to obtain a vinyl chloride resin composition. The obtained vinyl chloride resin composition was molded by the hard polyvinyl chloride-molding method that will be described later and was evaluated by the hard polyvinyl chloride evaluation method that will be described later. The results were as shown in Table 7.

TABLE 7

| | Ex.19 | Ex.20 | Ex.21 | Ex.22 | Ex.23 | Ex.24 | Ex.25 | Ex.26 | C. Ex.13 | C. Ex.14 | C. Ex.15 | C. Ex.16 |
| --- | --- | --- | --- | --- | --- | --- | --- | --- | --- | --- | --- | --- |
| Polyvinyl chloride | 100 | 100 | 100 | 100 | 100 | 100 | 100 | 100 | 100 | 100 | 100 | 100 |
| Fat and oil-saponified product composite silicate A | 2 | 2 | 2 | — | — | — | 2.5 | — | — | — | — | — |
| Fat and oil-saponified product composite silicate B | — | — | — | 2 | 2 | 2 | — | 2.5 | — | — | — | — |
| Zinc stearate | 0.7 | 0.7 | 0.7 | 0.7 | 0.7 | 0.7 | — | — | — | — | 0.7 | 0.7 |

TABLE 7-continued

|  | Ex.19 | Ex.20 | Ex.21 | Ex.22 | Ex.23 | Ex.24 | Ex.25 | Ex.26 | C. Ex.13 | C. Ex.14 | C. Ex.15 | C. Ex.16 |
| --- | --- | --- | --- | --- | --- | --- | --- | --- | --- | --- | --- | --- |
| Dipentaerythritol | 0.6 | 0.6 | 0.6 | 0.6 | 0.6 | 0.6 | — | — | — | — | 0.6 | 0.6 |
| Dibenzoylmethane | 0.1 | — | 0.1 | 0.1 | — | 0.1 | — | — | — | — | — | — |
| Diphenyltridecyl phosphite | — | 0.2 | 0.1 | — | 0.2 | 0.1 | — | — | — | — | 0.2 | 0.2 |
| Hiwax 220MP | 0.6 | 0.6 | 0.6 | 0.6 | 0.6 | 0.6 | 0.6 | 0.6 | 0.6 | 0.6 | 0.6 | 0.6 |
| Hydrotalcite | — | — | — | — | — | — | — | — | 2.5 | — | 2 | — |
| Zeolite 4A | — | — | — | — | — | — | — | — | — | 2.5 | — | 2 |
| Thermal stability (coloring time)(min) (Initial coloring) |  |  |  |  |  |  |  |  |  |  |  |  |
| 0 | no color | no color | no color | no color | no color | no color | faint yellow | faint yellow | pale orange | pale orange | faint yellow | faint yellow |
| 10 | no color | no color | no color | no color | no color | no color | faint yellow | faint yellow | pale orange | pale orange | faint yellow | faint yellow |
| 20 | no color | no color | no color | no color | no color | no color | pale orange | pale orange | pale orange | pale orange | pale orange | faint yellow |
| 30 | faint yellow | faint yellow | no color | faint yellow | faint yellow | no color | pale orange | pale orange | pale orange | pale orange | pale orange | pale orange |
| 40 | faint yellow | faint yellow | faint yellow | faint yellow | faint yellow | faint yellow | pale orange | pale orange | pale orange | pale orange | pale orange | pale orange |
| 50 | pale orange | pale orange | pale orange | pale orange | pale orange | pale orange | pale orange | pale orange | pale orange | pale orange | pale orange | pale orange |
| 60 | pale orange | pale orange | pale orange | pale orange | pale orange | pale orange | pale orange | pale orange | pale orange | pale orange | pale orange | pale orange |
| 70 | orange | orange | orange | orange | orange | orange | orange | orange | dark brown | orange | orange | orange |
| 80 | orange | orange | orange | orange | orange | orange | orange | orange | dark brown | dark brown | dark brown | dark brown |
| Thermal stability (HCl removing time) (min) | 200 | 200 | 230 | 195 | 195 | 200 | 210 | 205 | 130 | 160 | 150 | 180 |
| Plastograph gelling time (min) | 4.5 | 4.9 | 4.5 | 5.0 | 6.1 | 5.5 | 4.5 | 5.6 | 12.2 | 15.5 | 10.5 | 13.9 |
| Plastograph gelling torque (kgm) | 2.88 | 2.85 | 2.95 | 2.65 | 2.8 | 2.75 | 2.92 | 2.8 | 3.2 | 3.3 | 2.93 | 3.1 |
| Plate-out property | none | none | none | none | none | none | none | none | exists | great | great | great |

Ex.: Example, C.Ex. Comparative Example (Evaluation by Hard Polyvinyl Chloride)

Hard vinyl chloride sheets were prepared in accordance with the following blending and molding methods, and were evaluated. Results of the samples were as shown in Tables.

(Blend 1 is for the Samples of Examples 1 to 15 and Comparative Examples 1 to 7)

Vinyl chloride resin (polymerization degree of 1050) 100 parts by weight

Zinc stearate 0.5 parts by weight

Dipentaerythritol adipate 0.5 parts by weight

Dibenzoylmethane 0.05 parts by weight

Polyethylene wax 0.1 part by weight

Sample 2.0 parts by weight (Blend 2 is for the Samples of Examples 16 to 18 and Comparative Examples 8 to 12)

Vinyl chloride resin (polymerization degree of 1050) 100 parts by weight

Stearic acid 0.3 parts by weight

Polyethylene wax 0.2 parts by weight 2,2-Bis(4'-oxyphenyl) propane 0.1 part by weight Sample 2.0 parts by weight (Molding Method)

The above-blended compositions were kneaded using a roll mill at a temperature of 170° C. for 6 minutes to obtain homogeneously blended products having a thickness of 0.4 mm, which were then heated at a temperature of 180° C. under a pressure of 150 kg/cm$^2$ for 5 minutes in order to obtain hard vinyl chloride boards having a thickness of 1 mm.

(Testing Method)

(1) Thermal stability sustaining time

A sample board having a thickness of 0.4 mm was hanged in the Geer's thermal aging tester adjusted at a temperature of 190° C. The sample board was taken out after every 10 minutes to observe the degree of coloration by eyes, and the time was measured until it was decomposed into dark brown color.

(2) Foaming property

A sample board having a thickness of 2.5 mm was placed on a stanless steel plate, heated in the Geer's thermal aging tester adjusted at 190° C. for 30 minutes, and ruggedness on the surfaces of the sample board due to foaming was observed by eyes.

(3) Transparency

By using a color-difference meter, Model 1001DP, manufactured by Nippon Denshoku Kogyo Co., a sample sheet having a thickness of 0.5 mm was measured for its white color transmission factor.

(4) Charpy impact test

Conducted in compliance with the Charpy impact testing method for hard plastics stipulated under JIS K7111.

(5) Dispersion property

A sample board having a thickness of 0.2 mm was placed on a sample plate of an optical microscope, and the particle size distribution of sample particles dispersed in the sheet was observed by eyes in a visible field of the microscope of a magnification of 60 times as light transmits through the sample in a vertical direction.

(6) Gelling property

60 Grams of the resin and 2.4 g of the sample were thrown into a Laboplastomill, Model 30R150, manufactured by Toyo Seiki Co., that was heated at 180° C. and rotated at 40 rpm, in order to measure gelling properties of the samples.

(7) Plate-out property

60 Grams of the resin and 2.4 g of the sample were thrown into a Laboplastomill, Model 30R150, manufactured by Toyo Seiki Co., that was heated at 180° C. and rotated at 40 rpm, in order to observe by eyes the plate-out property of the samples when gelling was completed.

Evaluation was made on the following basis:
- ⊚: No plate-out.
- o: Plate-out exists.
- ●: Large plate-out.

(Evaluation by Soft Polyvinyl Chloride)

Soft vinyl chloride sheets were prepared in accordance with the following blending and molding methods, and were evaluated. Results of the samples were as shown in Tables.

(Blend 3 is for the Samples of Examples 1 to 15 and Comparative Examples 1 to 7)

| | |
|---|---|
| Vinyl chloride resin (polymerization degree of 1050) | 100 parts by weight |
| Dioctyl phthalate | 50 parts by weight |
| Zinc stearate | 0.5 parts by weight |
| Dipentaerythritol | 0.25 parts by weight |
| Bisphenol A | 0.1 part by weight |
| Dibenzolymethane | 0.05 part by weight |
| Sample | 2.5 parts by weight |

(Blend 4 is for the Samples of Examples 16 to 18 and Comparative Examples 8 to 12)

| | |
|---|---|
| Vinyl chloride resin (polymerization degree of 1050) | 100 parts by weight |
| Dioctyl phthalate | 50 parts by weight |
| Polyethylene wax | 0.2 parts by weight |
| 2,2-Bis(4'-oxyphenyl) propane | 0.1 part by weight |
| Sample | 2.0 parts by weight |

(Molding Method)

The above-blended compositions were kneaded using a roll mill at a temperature of 150° C. for 6 minutes to obtain homogeneously blended products having a thickness of 0.4 mm, which were then heated at a temperature of 175° C. under a pressure of 150 kg/cm² for 5 minutes in order to obtain soft vinyl chloride sheets having a thickness of 1 mm.

(Testing Method)

(1) Thermal stability sustaining time

A sample board having a thickness of 0.4 mm was placed on a tefron board and was introduced into the Geer's thermal aging tester adjusted at a temperature of 185° C. The sample board was taken out after every 15 minutes to observe the degree of coloration by eyes, and the time was measured until it was decomposed into black color.

(2) Thermal stability

In compliance with JIS K 6723, the sample sheet was cut into 1 mm×1 mm. A test tube provided with a Congo Red paper was filled with 2 g of sample chips, and was heated at 180° C. in order to measure the time for removing hydrogen chloride due to the thermal decomposition vinyl chloride.

(3) Electric insulating property

The sample sheet was measured for its volume resistivity at 30° C. in compliance with JIS K 6723.

(4) Transparency

By using a color-difference meter, Model 1001DP, manufactured by Nippon Denshoku Kogyo Co., a sample sheet having a thickness of 1.0 mm was measured for its white color transmission factor.

We claim:

1. A process for the preparation of a stabilizer for chlorine-containing polymers which comprises a fat or oil-saponified product composite silicate, comprising:

mixing and reacting;
   (1) a composition which contains, on the basis of two components;
      (a) 2 to 99% by weight of a siliceous compound selected from the group consisting of silicic acid, silicate, aluminosilicate and acid-treated products thereof, and having reactive silicic acid; and
      (b) 1 to 98% by weight of fat or oil; and
   (2) a metal reactant which is at least one selected from the group consisting of oxides, hydroxides and reactive salts of a metal of the Group II, IV or V of the Periodic Table, in an amount which is sufficient to saponify the fat or oil and neutralize the reactive silicic acid;

in the presence of water to convert the reactive silicic acid into a silicate of the metal of the Group II, IV or V and carry a saponified product of fat or oil on the siliceous compound; and heat-treating the obtained product under atmosphere pressure or under reduced pressure at 50° to 300° C.

2. A process for the preparation of a stabilizer for chlorine-containing polymers according to claim 1, wherein said siliceous compound contains not smaller than 10% by weight of the reactive silicic acid.

3. A process for the preparation of a stabilizer for chlorine-containing polymers according to claim 1, wherein said siliceous compound has a specified surface area of not smaller than 10 m²/g.

4. A process for the preparation of a stabilizer for chlorine-containing polymers according to claim 1, wherein said composition is a waste clay discharged from the step of refining fat or oil.

5. A process for the preparation of a stabilizer for chlorine-containing polymers according to claim 1, wherein said metal of the Group II is an alkaline earth metal and/or zinc.

6. A process for the preparation of a stabilizer for chlorine-containing polymers according to claim 5, wherein the alkaline earth metal is calcium.

7. A process for the preparation of a stabilizer for chlorine-containing polymers according to claim 1, wherein said metal of the Group IV is lead.

8. A process for the preparation of a stabilizer for chlorine-containing polymers according to claim 1, wherein said metal reactant is used in an amount which is from 1.01 to 2000 times as great as an equivalent of KOH required for saponifying fat or oil on the weight basis.

9. A process for the preparation of a stabilizer for chlorine containing polymers according to claim 1, wherein said reacting is carried out under wet-grinding mixing.

10. A process for the preparation of a stabilizer for chlorine-containing polymers which comprises a fat or oil-saponified product composite silicate, comprising:

providing a siliceous compound which is selected from the group consisting of silicic acid, silicate, aluminosilicate and acid-treated products thereof, and has reactive silicic acid; a metal reactant which is at least one selected from the group consisting of oxides, hydroxides and reactive salts of a metal of the Group II, IV or V of the Periodic Table; and a fat or oil;

reacting the siliceous compound with an excess mol amounts of the metal reactant in the presence of water to convert the reactive silicic acid into a silicate of the metal;

adding the fat or oil to the obtained mixture under a grinding condition to saponify the fat or oil and carry a saponified product of fat or oil on the siliceous compound; and heat-treating the obtained product under atmosphere pressure or under reduced pressure at 50° to 300° C.

11. A process for the preparation of a stabilizer for chlorine-containing polymers according to claim 10, wherein as the metal reactant, an oxide, a hydroxide or a reactive salt of zinc is used in an amount of 0.1 to 50% by weight per the siliceous compound.

12. A stabilizer for chlorine-containing polymers comprising a fat or oil-saponified product composite silicate which has an infrared-ray absorption spectrum that indicates no absorption near 1647 $cm^{-1}$ due to O—H bond, and contains, on the basis of three components:

1 to 99% by weight of siliceous compound particles composed chiefly of amorphous or low-crystalline silicate of a metal of the Group II, IV or V of the Period Table;

0.4 to 97% by weight of higher fatty acid salts of the metal; and 0.02 to 60% by weight of glycerin or a glycerin derivative which is glycerin mono- or di-ester, or di-glycerin;

wherein the higher fatty acid salts and the glycerin or the glycerin derivative are held in the pores and on the surfaces of said siliceous compound particles.

13. A stabilizer for chlorine-containing polymers according to claim 12 wherein the salt of the metal of the Group II is an alkaline earth metal salt or a zinc salt.

14. A stabilizer for chlorine-containing polymers according to claim 12, wherein the salt of the metal of the Group IV is a lead salt.

15. A stabilizer for chlorine-containing polymers according to claim 12, wherein said alkaline earth metal salt is a calcium salt.

16. A chlorine-containing polymer composition comprising, per 100 parts by weight of a choline-containing polymer, (A) 0.1 to 50 parts by weight of a fat or oil-saponified product composite silicate of claim 12, (B) 0.1 to 50 parts by weight of a oxide, a hydroxide and reactive salt of zinc, (C) 0.1 to 5 parts by weight of alcohols or partial ester thereof, and (D) 0.05 to 5 parts by weight of B-diketone, B-keto ester or phosphorus ester.

* * * * *